US012062266B2

(12) United States Patent
Narita et al.

(10) Patent No.: US 12,062,266 B2
(45) **Date of Patent: *Aug. 13, 2024**

(54) CASINO CLAW GAME

(71) Applicant: Empire Technological Group Limited, Las Vegas, NV (US)

(72) Inventors: Takaki Narita, Tokyo (JP); Kenji Enokido, Tokyo (JP); Hiroki Saito, Tokyo (JP); Satoshi Joko, Tokyo (JP); Go Miyamoto, Tokyo (JP); Akira Shimizu, Tokyo (JP); Hiromu Saigusa, Tokyo (JP); Jyunichi Murakami, Tokyo (JP); Satoshi Nakata, Tokyo (JP); Masahiro Sugimoto, Tokyo (JP)

(73) Assignee: Empire Technological Group Limited, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,372

(22) Filed: May 23, 2023

(65) Prior Publication Data

US 2023/0298440 A1 Sep. 21, 2023

Related U.S. Application Data

(63) Continuation of application No. 17/459,685, filed on Aug. 27, 2021, now Pat. No. 11,727,765.

(Continued)

(51) Int. Cl.
*G07F 17/32* (2006.01)

(52) U.S. Cl.
CPC ...... *G07F 17/3297* (2013.01); *G07F 17/3209* (2013.01); *G07F 17/3216* (2013.01);

(Continued)

(58) Field of Classification Search
CPC ..... A63F 9/30; G07F 17/3202; G07F 17/3297
See application file for complete search history.

(56) References Cited

U.S. PATENT DOCUMENTS 4,685,673 A 8/1987 Verstraeten
4,718,667 A 1/1988 Shoemaker, Jr.

(Continued)

FOREIGN PATENT DOCUMENTS

CN 111179518 A * 5/2020 ......... G07F 17/3202
CN 111179518 A 5/2020

OTHER PUBLICATIONS

Edwards, Phil, "Claw machines are rigged—here's why it's so hard to grab that stuffed animal", VoxMedia, Jun. 3, 2015, https://www.vox.com/2015/4/3/8339999/claw-machines-rigged.

(Continued)

*Primary Examiner* — Jasson H Yoo
(74) *Attorney, Agent, or Firm* — RowanTree Law Group, PLLC; Magdalena M. Fincham

(57) ABSTRACT

A claw gaming machine may comprise a cabinet, a claw assembly, prize objects, and a shooter unit. The machine may be configured to: determine an outcome of a claw game; allow an input device to control the claw assembly; end the claw game when the claw assembly does not pick up a prize object and the determined outcome is a losing outcome; cause the claw assembly to move and release the picked-up object away from the shooter unit when the claw assembly does pick-up a prize object and the determined outcome is a losing outcome, cause the claw assembly to drop the picked-up object on the shooter unit when the claw assembly picks-up the object and the determined outcome is a winning outcome; and cause a winning game presentation display when the claw assembly does not pick up a prize object and the determined outcome is a winning outcome.

20 Claims, 19 Drawing Sheets

Related U.S. Application Data

(60) Provisional application No. 63/071,700, filed on Aug. 28, 2020.

(52) U.S. Cl.
CPC ...... *G07F 17/3253* (2013.01); *G07F 17/3213* (2013.01); *G07F 17/3267* (2013.01)

(56) References Cited

U.S. PATENT DOCUMENTS

| | | | | |
|---|---|---|---|---|
| 6,957,813 | B2 | 10/2005 | Verstraeten | |
| 7,604,238 | B2 | 10/2009 | Verstraeten | |
| 7,857,318 | B1 | 12/2010 | Shoemaker et al. | |
| 8,251,369 | B2 | 8/2012 | Verstraeten | |
| 10,565,830 | B1 * | 2/2020 | Georgilas | G07F 17/3297 |
| 11,727,765 | B2 * | 8/2023 | Narita | G07F 17/3209 463/22 |
| 2004/0048659 | A1 | 3/2004 | Seelig et al. | |
| 2021/0056809 | A1 * | 2/2021 | Harris | G07F 17/3253 |

OTHER PUBLICATIONS

Scutari, Nicholas, “New Bill Proposes To Treat New Jersey Skill Cranes As Games of Chance”, Vending Times, Aug. 8, 2016, https://www.vendingtimes.com/news/new-bill-proposes-to-treat-new-jersey-skill-cranes-as-games-of-chance/.
Montano, Nick, “Elaut Sues SB Candy And Toy Co For Patent Infringement Unfair Competition”, Vending Times, Jun. 27, 2016, https://www.vendingtimes.com/news/elaut-sues-sb-candy-and-toy-co-for-patent-infringement-unfair-competition/.
“A good source for claw industry news” https://www.vendingtimes.com/resources/#addsearch=claw%20machines,f=1.
United States Notice of Allowance dated Mar. 28, 2023 for U.S. Appl. No. 17/459,685.

* cited by examiner

| Weights | # of Prize Objects at that weight | rng range for winning outcome | If determined to be a winning outcome, additional random decision to determine size of win | | |
|---|---|---|---|---|---|
| | | | Big Win | Medium Win | Small Win |
| 6 oz | 1 | 0-50 | 5% | 10% | 85% |
| 8 oz | 2 | 25-125 | 4% | 8% | 88% |
| 10 oz | 3 | 50-150 | 3% | 6% | 91% |
| 12 oz | 4 | 75-150 | 1% | 5% | 94% |
| 14 oz | 3 | 75-175 | 3% | 6% | 91% |
| 16 oz | 1 | 150-200 | 5% | 10% | 85% |

FIG. 18A
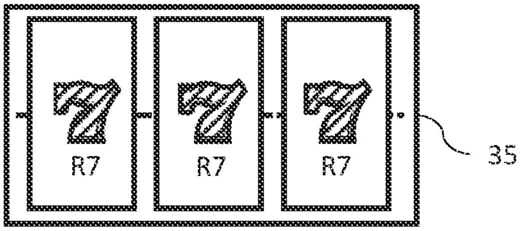
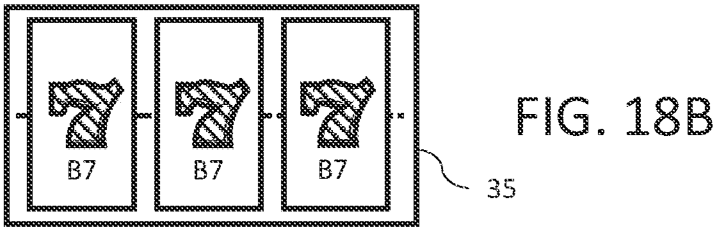
FIG. 18B
FIG. 18C
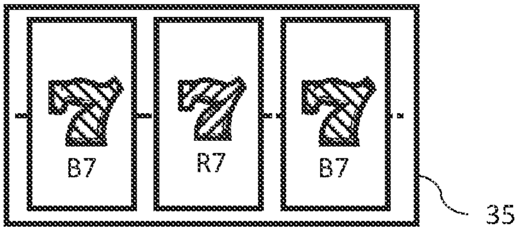
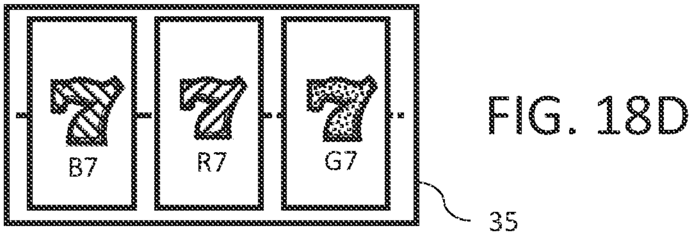
FIG. 18D

CASINO CLAW GAME

CROSS-REFERENCE TO RELATED APPLICATIONS

This application is a continuation under 35 U.S.C. § 120 of U.S. patent application Ser. No. 17/459,685, filed Aug. 27, 2021, which claims the benefit of U.S. Provisional Application No. 63/071,700 filed Aug. 28, 2020. The above-referenced patent applications are incorporated by reference in their entirety.

BACKGROUND

Field of the Invention

The present disclosure relates to improvements to claw gaming machines, claw games and methods for same, and specifically to claw gaming machines configured for operation in a casino.

Description of the Related Technology

Claw games, sometimes referred to as crane games, are popular and are often found in children's arcades. In a typical configuration, the player would use their skill to try and arrange the claw to pick up a prize, and if they were successful, they would be awarded the prize that the claw picked up. In such a sense, traditional claw games are not very secure, as they are "open" games in that there is an open path from within the claw game to the outside so that the physical prize can be moved from inside the game to the player in a winning scenario. This openness provides a pathway for the game to be compromised and allow for cheating. While there have been several attempts by various regulatory bodies to regulate these claw games, the industry has apparently largely avoided such regulation by arguing that these games are games of skill, and that the likelihood of winning a prize is mostly dependent on the player's skill rather than a random determination.

There have been some indications that traditional claw games could be adjusted to make it harder or easier to win a prize, and that such adjustments could roughly be aligned with an operator's desired profit margin. However, it appears that these alleged game configuration options are very unsophisticated and unreliable, and therefore are not able to provide consistent long-term and verifiable expected returns.

A game operating in a regulated casino environment must satisfy very strict regulations around their payback percentage, often referred to as a return-to-player ("RTP"), and must be able to verify that the game operates in accordance with its indicated RTP. For example, if a game is approved based on an RTP of 90%, that would mean that over hundreds of thousands of plays, the game would be expected to payout about 90% of all received wagers to players, and keep the remaining roughly 10% for the casino operator. In most jurisdictions, a casino operator is not allowed to change the RTP of a game without first getting regulatory approval, hence once a game is placed on the casino floor with an authorized RTP, that game must remain at that RTP.

SUMMARY

The present disclosure provides claw gaming machines, claw games and methods configured to operate in a regulated casino environment.

In one embodiment, the claw gaming machine comprises a random number generator that is used to determine whether a play of the claw gaming machine will be a losing play or a winning play.

In another embodiment, the claw gaming machine comprises multiple prize objects that the player can attempt to pick up with the claw, but the prize objects are not awarded to the player.

In still another embodiment, the claw gaming machine comprises weight sensors in the field to assist in verifying that a prize object was successfully picked up by the claw.

In a further embodiment, the claw gaming machine comprises a large video display that helps inform the player of their game outcome.

In an additional embodiment, the casino claw gaming machine is a closed system, thereby diminishing the ability to compromise the game.

In another embodiment, the claw gaming machine comprises a claw assembly with a stepper motor to provide more precision in the claw's operation.

In a further embodiment, the claw gaming machine comprises a shooter unit, which may be configured to verify that a prize object was successfully placed on it, and to then return the prize object to the play field.

In one embodiment, a casino claw gaming machine comprises a cabinet, a play field within the cabinet supporting a plurality of prize objects, a claw assembly moveably attached within the cabinet, a player input device positioned outside the cabinet, a video display attached to the cabinet, a currency acceptor attached to the cabinet, at least one processor and at least one memory device storing instructions. The instructions, when executed by the processor, cause the processor to: after receiving physical indicia of monetary value via the currency acceptor, validate the receiving of the physical indicia of monetary value; receive an electronic communication to begin a claw game; determine a game outcome for the claw game based on a computerized random number generator; allow the input device to control the claw assembly, thereby allowing a player of the claw game to position the claw assembly; and determine whether the player caused the claw assembly to pick up one of the plurality of prize objects. The instructions, when executed by the processor, further cause the processor to: when the determination of whether the player caused the claw assembly to pick-up one of the plurality of prize objects is the player did not cause the claw assembly to pick up one of the plurality of prize objects and when the determined game outcome is a losing outcome, end the claw game; when the determination of whether the player caused the claw assembly to pick-up one of the plurality of prize objects is the player did cause the claw assembly to pick up one of the plurality of prize objects and when the determined game outcome is a losing outcome, cause the claw assembly to move in a predetermined release pattern and drop the picked-up prize object away from the shooter unit; when the determination of whether the player caused the claw assembly to pick-up one of the plurality of prize objects is the player did cause the claw assembly to pick up one of the plurality of prize objects and when the determined game outcome is a winning outcome, instruct the claw assembly to drop the picked-up prize object on the shooter unit; and when the determination of whether the player caused the claw assembly to pick-up one of the plurality of prize objects is the player did not cause the claw assembly to pick up one of the plurality of prize objects and when the determined game outcome is a winning outcome, cause the video display to display a winning game presentation. The instructions, when executed by the processor, may further cause the processor to cause the video display to display messaging about the determined game outcome and cause any awards from the claw game to be provided to the player.

In another embodiment, a casino claw gaming machine comprises a cabinet, a play field within the cabinet supporting a plurality of prize objects, a claw assembly moveably attached within the cabinet, a player input device positioned outside the cabinet, a video display attached to the cabinet, a currency acceptor attached to the cabinet, at least one processor and at least one memory device storing instructions. The instructions, when executed by the processor, cause the processor to: (a) after receiving physical indicia of monetary value via the currency acceptor, validate the receiving of the physical indicia of monetary value, (b) receive an electronic communication to begin a claw game, (c) determine a game outcome for the claw game based on a computerized random number generator, and (d) cause the claw assembly to move based on input received by the player input device. The instructions, when executed by processor, further cause the processor to: (e) determine whether the claw assembly picked up one of the plurality of prize objects, (f) when the determination of whether the claw assembly picked up one of the plurality of prize objects is the claw assembly picked up one of the plurality of prize objects, determine whether the picked up prize object matches a component of the determined game outcome, (g) when the determination of whether the picked up prize object matches a component of the determined game outcome is the picked up prize object matches a component of the determined game outcome, instruct the claw assembly to drop the picked-up prize object on the shooter unit, (h) when the determination of whether the picked up prize object matches a component of the determined game outcome is the picked up prize object does not to match a component of the determined game outcome, instruct the claw assembly to drop the picked-up prize object on the play field, (i) when the picked-up prize object is dropped on the shooter unit, cause the shooter unit to verify the prize object dropped on the shooter unit and return the prize object dropped on the shooter unit to the play field, and allow steps (d) through (i) to be repeated until a prescribed condition occurs. The instructions, when executed by the processor, may further cause the processor to cause the display device to display messaging about the determined game outcome and cause any awards from the claw game to be provided to the player.

BRIEF DESCRIPTION OF THE DRAWINGS

FIGS. 18A to 18D are examples of winning combinations, according to one embodiment of the present disclosure.

Figure 1:
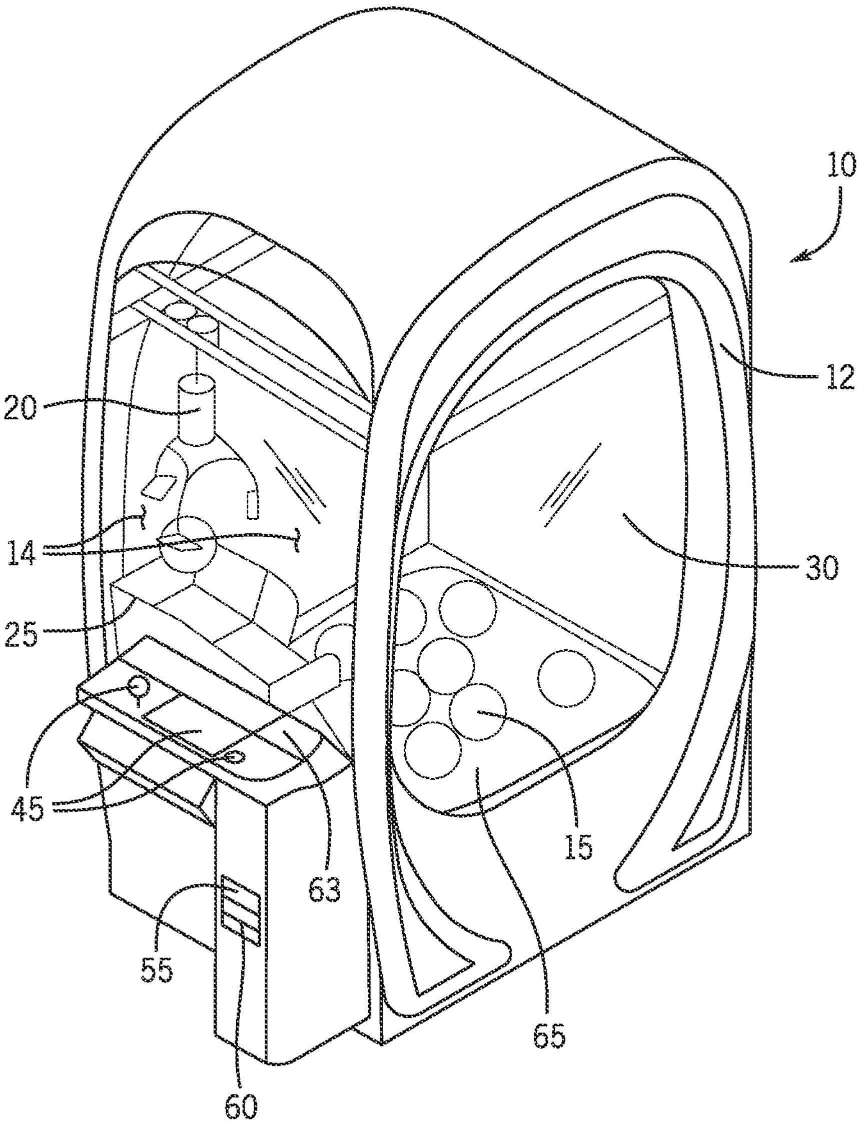
FIG. 1 is a perspective view of a casino claw gaming machine, according to one embodiment of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples consistent with the description; however, the description is not limited to the examples provided in the drawings.

DETAILED DESCRIPTION

Referring to FIG. 1, a casino claw gaming machine 10 according to an embodiment of the present disclosure is shown. In one embodiment, a player places something of value at risk on an outcome that is unknown and uncertain to the player, and the casino claw gaming machine 10 will display the associated outcome, thereby informing the player of the resolution associated with their placing said something at risk.

Casino claw gaming machine 10 includes a cabinet 12 which typically houses sensitive components of the casino claw game 10. Cabinet 12 can be made from wood, metal, or any other structurally secure material. In the present disclosure, cabinet 12 comprises at least one window 14. Window 14 can be glass, clear acrylic, or any other transparent material that protects the integrity of cabinet 12 and prevents a player from accessing internal elements of the casino claw game 10. FIG. 1 illustrates an embodiment that has three distinct windows 14, one on the player-facing side of the cabinet 12, and one on either side of the cabinet 12. It is contemplated that providing visual access to the casino claw gaming machine 10 can help create interest by other people near the casino claw gaming machine 10.

Casino claw gaming machine 10 has one or more display devices 30, which are utilized to display aspects of a game, or may be used to convey information to players of the game. The display device can be a video display, such as a liquid crystal display (LCD), a light-emitting diode (LED) panel display, a plasma display, an electroluminescent (EL) display, an organic light-emitting diode (OLED) display, a cathode ray tube (CRT) display, a surface-conduction electron-emitter display (SED), a digital light projection (DLP) display, a polymer light-emitting diodes (PLED) display, an LCD projection display, any combination thereof, or any other display capable of displaying video. It is further contemplated that display device 30 can be a traditional 2-D display, or a 3D display.

It is contemplated that casino claw gaming machine 10 has one or more input devices 45. Input device 45 could be utilized by a player to select components of their game, such as the amount of their wager or how to allocate their wager within the game, and allow them to initiate the play of the game, for example by selecting a "Play" button or other play initiating button. It is contemplated that input device 45 can be physical buttons or virtual buttons, such as a touchscreen input, or a combination thereof. In one embodiment, input device 45 includes a joystick which can be used to control the direction, speed, action, or other aspects of the claw assembly 20. In another embodiment, such a joystick might comprise sensors to allow a player to control the X and Y directions of the claw assembly 20, and also comprise a button to allow the player to initiate the claw to drop and attempt to pick up a prize object 15.

Casino claw gaming machine 10 may also include speakers (not shown). It is contemplated that speakers can work independently of each other, work in coordination with each other, work in coordination with other speakers, for example speakers located in a player seat associated with casino claw gaming machine 10, work as part of a surround sound system, or any combination thereof.

Casino claw gaming machine 10 also includes a currency acceptor 55. In one embodiment, currency acceptor 55 is a bill acceptor which accepts paper money. In another embodiment, currency acceptor is a coin acceptor which accepts coins. In still another embodiment, casino claw gaming machine 10 includes more than one currency acceptor 55. In another embodiment, currency acceptor 55 can accept multiple denominations of currency, or even currencies from multiple countries. In still another embodiment, currency acceptor 55 can accept a ticket or similar physical indicium that is distributed by a casino or another gaming machine, which indicates an amount of currency available for use on casino claw gaming machine 10. In a further embodiment, currency acceptor 55 can accept credit cards, debit cards, or other instruments to initiate an electronic funds transfer. It is also contemplated that instead of a currency acceptor 55, the casino claw gaming machine 10 provides another means to allow a player to access money in order to wager on a play of the game. For example, the player may enter a PIN in order to access an account they have, either with a bank or the casino itself, and upon entering the PIN and other information, certain amount of funds are transferred to the casino claw gaming machine 10 or otherwise allowed to be wagered via casino claw gaming machine 10. In another embodiment, currency acceptor 55 is configured to interact with a radio frequency identification (RFID), a Bluetooth, a near-field communication (NFC), a WiFi, and/or other short-range or medium-range communication device which can transmit financial information short and/or medium distances, for example a bracelet, smart watch, smartphone, or other similar devices.

The casino claw gaming machine 10 of FIG. 1 is also shown with a ticket printer 60, which is utilized to cash money out of casino claw gaming machine 10. It is common now that gaming machines accept currency, but will only provide a ticket upon cashout, and then the holder of the ticket must take the ticket to the cashier's cage or a ticket redemption kiosk in order to obtain the currency indicated by the ticket. For casino claw gaming machine 10, it is contemplated that after a player elects to cashout by selecting an appropriate input device 45, printer 60 prints out a tickets which indicates the amount of currency the player elected to cashout, and the player can then take the ticket and insert it into another gaming machine, or visit a cashier's cage or a ticket redemption kiosk to exchange the ticket for currency.

It is contemplated that a single device could be configured to perform the functions of currency acceptor 55 and ticket printer 60, thereby consolidating those two functions into one device.

Casino claw gaming machine 10 may also include a player tracking device 63. It is contemplated that casino claw gaming machine 10 could include a visibly distinct player tracking device 63, or a visually integrated player tracking device that utilizes a portion of a player input deck, generally shown with input devices 45. In practice, a player makes their identity known to the player tracking device 63, either actively by inserting a player tracking card and/or entering a PIN into player tracking device 63, or passively by utilizing a location device, such as a radio frequency identification (RFID) or a Bluetooth device which can transmit information short distances. Thereafter, the player tracking device 63 communicates over a network with a casino tracking system to track a player's play, and potentially offer awards or other services to the player, often through the same player tracking device 63. The player tracking device 63 can also display player status information back to the player, or other information based on or otherwise related to a player's play history and/or status, including awards earned by a player. It is also contemplated that the networked player tracking device 63 can be utilized to offer other services to players, such as the ordering of drinks, or making promotional offers to a player, perhaps working in coordination with ticket printer 60 to do so.

Figure 2:
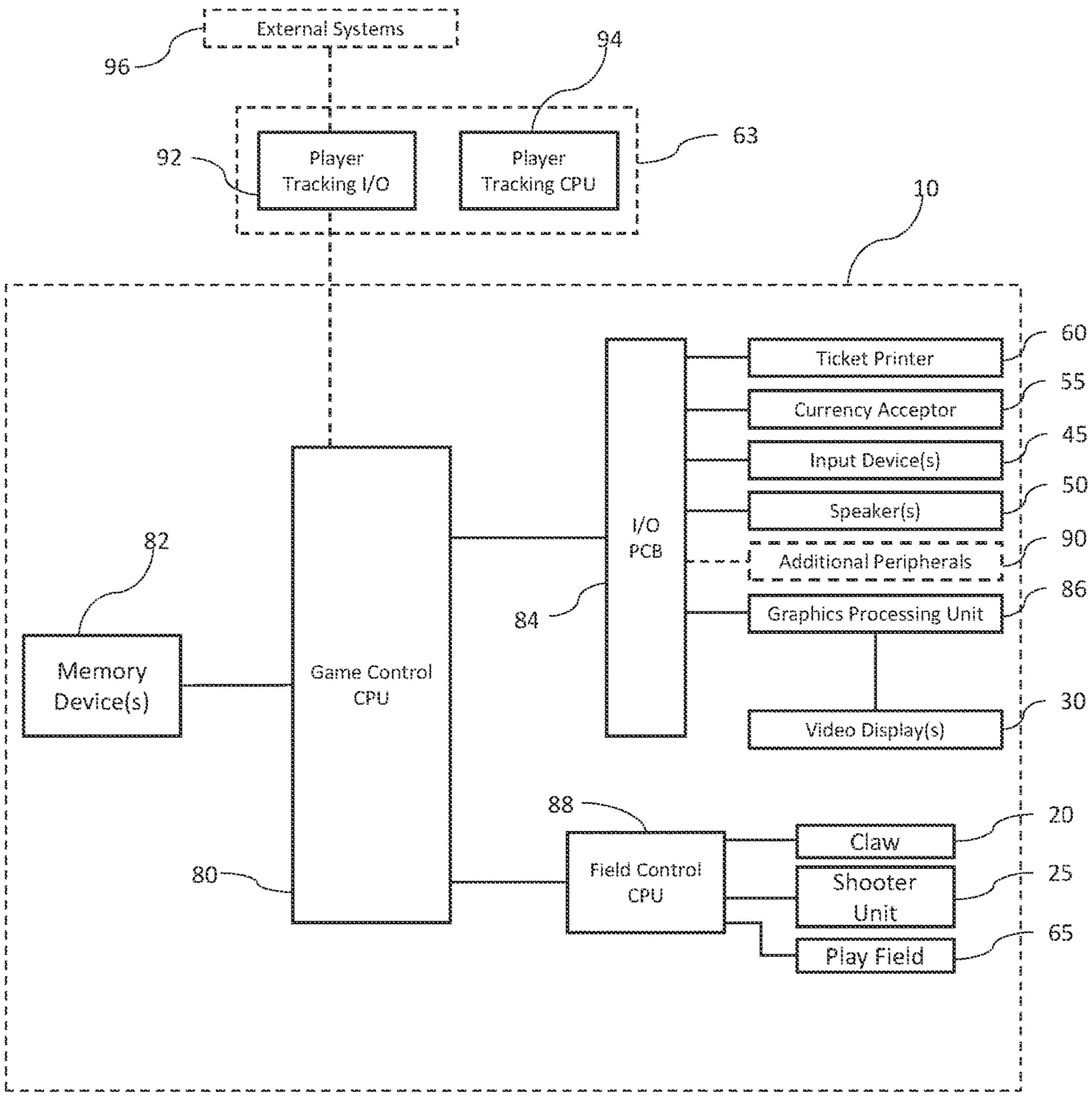
FIG. 2 is a schematic view of a casino claw gaming machine, according to one embodiment of the present disclosure.

FIG. 2 is a schematic diagram of a gaming system in accordance with one embodiment of the present disclosure. In this embodiment, casino claw gaming machine 10 utilizes a game control central processing unit (CPU) 80, such as a processor, a microprocessor, or the like. CPU 80 can perform arithmetic and logical operations, and also extract instructions from memory device(s) 82 and decodes and executes them. Alternatively, it is contemplated that instead of CPU 80, an array processor or a vector processor having multiple parallel computing elements, which utilizes a distributed computing model, may be employed to perform such arithmetic and logical operations.

Memory device(s) 82 can include one or more distinct types of memory devices, such as random access memory (RAM) or dynamic RAM (DRAM), which can include non-volatile RAM (NVRAM), magnetic RAM (MRAM), ferroelectric RAM (FeRAM) and other forms as commonly understood in the computing industry. In one embodiment, the memory device(s) 82 includes read only memory (ROM), which may, for example, store regulatory-sensitive instructions for casino claw gaming machine 10. In one embodiment, the memory device(s) 82 includes flash memory and/or EEPROM (electrically erasable programmable read only memory). Any other suitable magnetic, optical and/or semiconductor memory may operate in conjunction with the casino claw gaming machine 10 disclosed herein.

In some embodiments, memory device(s) 82 store program code that is executable by CPU 80. Memory device(s) 82 may also store operating data, such as a random number generator (RNG), game instructions, event data, display files, game history, and other such data and instructions that allow for the gaming machine 10 to properly function in a regulated environment.

CPU 80 is communicatively connected to an input/output device such as input/output printed circuit board (I/O PCB) 84 which operates as an electrical interface between CPU 80 and various peripherals of the casino claw gaming machine 10. FIG. 2 further illustrates various peripherals, including ticket printer 60, currency acceptor 55, input device(s) 45, speakers 50, and other additional peripherals 90. Also illustrated is a graphic processing unit (GPU) 86, which works in coordination with CPU 80 to control video display(s) 30 and causes them to display various aspects of a game.

In various embodiments, game control CPU 80 communicates with field control CPU 88. Field control CPU 88 may utilize internal memory, rely on memory devices external to the field control CPU 88, or a combination thereof. Field control CPU 88 further communicates with the claw assembly 20, the shooter unit 25, and the play field 65. The purposes and manner of such communication are further discussed below.

Also communicatively connected to CPU 80 is a player tracking device 63. It is contemplated that the player tracking device 63 includes a distinct player tracking input/output (I/O) 92 and player tracking CPU 94, as well as associated player tracking memory (not shown). In one embodiment, it is contemplated that player tracking device 63 could have a direct line of communication with ticket printer 60. In such an embodiment, the player tracking device 63 could then cause ticket printer 60 to print out promotional tickets without having to first communicate with gaming machine CPU 80, which may be desirable from a regulatory perspective. FIG. 2 also illustrates that casino claw gaming machine 10 is communicatively connected to external systems 96, which could include one or more of an accounting system, player tracking system, player bonusing system, player assistance system, server-based gaming system or other game content management system, wide area network (WAN), local area network (LAN), the internet, or other communication systems.

Figure 3:
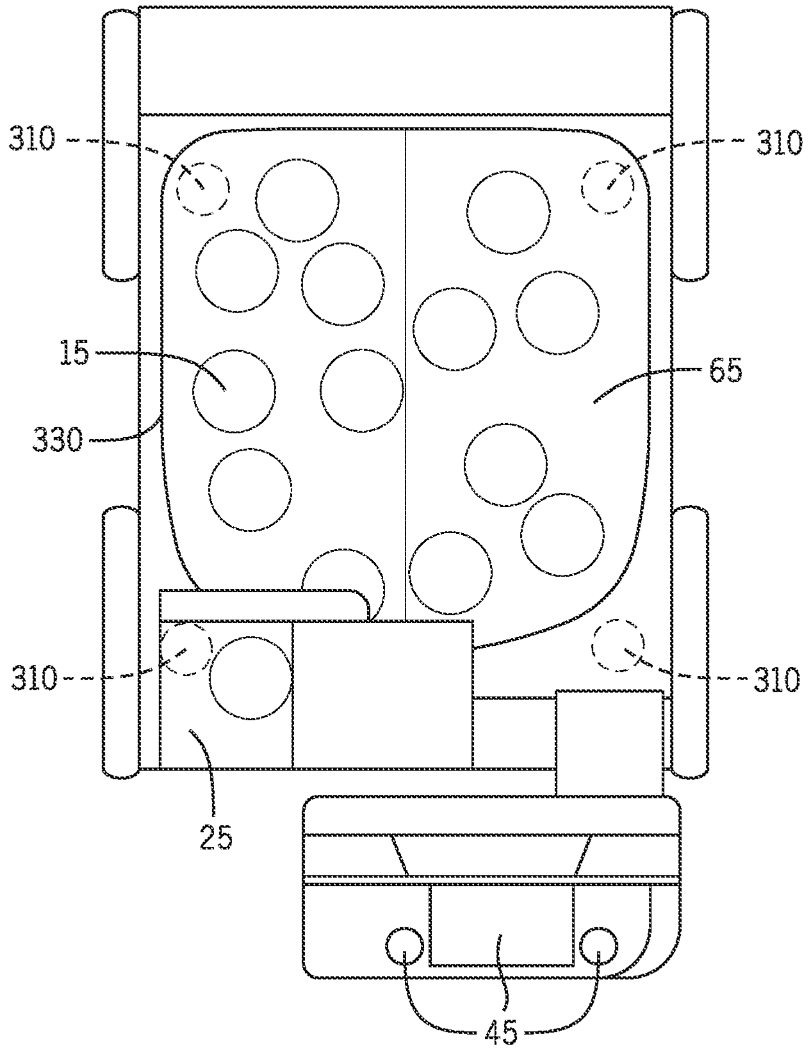
FIG. 3 is an overhead view of a play field of a casino claw gaming machine, according to one embodiment of the present disclosure.

FIG. 3 illustrates a top view of the play field 65 in accordance with one embodiment. In this example, play field 65 houses a plurality of prize objects 15. FIG. 3 illustrates prize objects 15 as uniformly-sized balls, but it is contemplated that prize objects 15 can be any shape that is amenable to being picked up by a claw assembly 20, and that there could be various different shapes of prize objects 15 on a play field 65.

Play field 65, in one embodiment, includes a play field bumper 330. In this embodiment, play field bumper 330 is configured to prevent prize objects 15 from resting against the side of claw gaming machine cabinet, which may produce inaccurate field weight results and/or cause difficulties for the claw assembly 20 to pick up a prize object 15. In another embodiment, play field 65 is depressed from the play field bumper 330, which assists in retaining the prize objects 15 away from the sides of the casino claw gaming machine 10. In this embodiment, play field bumper 330 may simple be the edge of such a depression. In still a further embodiment, play field bumper 330 is a raised edge from the play field 65.

The present embodiment further includes one or more weight sensors 310, which are shown in hidden line format because they are positioned below play field 65. As will be discussed in more detail below, weight sensors 310 can be used to determine if a prize object 15 was successfully picked up by a claw assembly 20, by determining the weight of the play field 65. It is also contemplated that the claw assembly 20 itself may incorporate one or more weight sensors which can be used to determine if a prize object 15 was successfully picked up by the claw assembly 20.

FIG. 3 further illustrates a top view of shooter unit 25. In this example, shooter unit 25 has a prize object 15 positioned on it, which will be verified and then returned to the play field 65. Further functionality of the shooter unit 25 is discussed below.

Figure 4A:
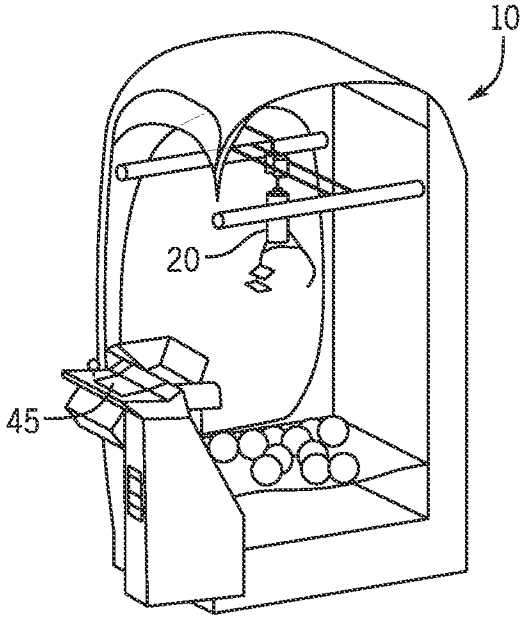
FIGS. 4A to 4D are perspective views of a casino claw gaming machine, illustrating the actions of unsuccessfully and successfully picking up a prize object, according to additional embodiments of the present disclosure.

FIGS. 4A to 4D provide a general view of the operation of the casino claw gaming machine 10, in accordance with various embodiments. In this example, FIG. 4A illustrates the claw assembly 20 being moved into position. It is contemplated that the claw assembly 20 would be operated by a player (not shown) using player input devices 45, such as a joystick, touchscreen, track ball, buttons, or other input device configured to control the claw assembly 20.

Figure 4B:
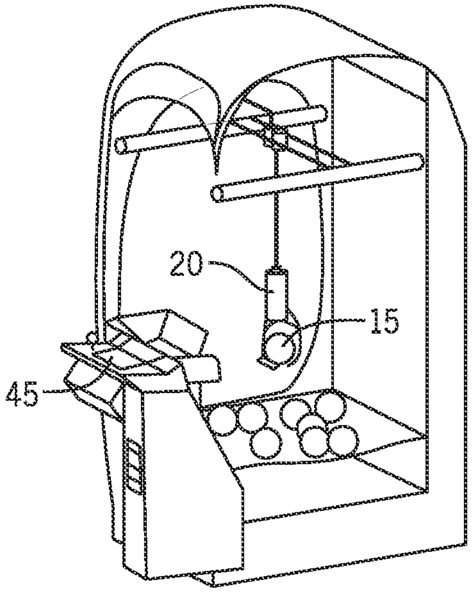

FIG. 4B illustrates that the claw assembly 20 successfully picked up a prize object 15. In one embodiment, once a player has positioned the claw assembly 20 to where they want to attempt a pickup, they would convey this through an input device 45 such as a button, and the claw assembly 20 would drop down and attempt to pick up a prize object 15. In another embodiment, the casino claw gaming machine 10 may be configured to provide a specific amount of time to allow a player to try and position the claw assembly 20, and if or when that time expired, the claw assembly 20 would automatically drop down and attempt to pick up a prize object 15. In the present embodiment, once claw assembly 20 has attempted to pick up a prize object 15, it will automatically return to a home position, e.g., above shooter unit 25.

Figure 4C:
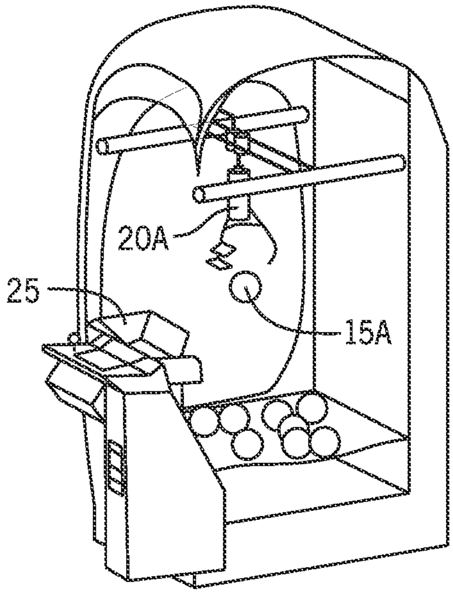

FIG. 4C illustrates an example where the play of the casino claw gaming machine 10 was determined to be a losing game. In this example, claw assembly 20A opens based on instructions received from the field control CPU 88, and drops the prize object 15A prior to the claw assembly 20A being positioned over the shooter unit 25, so that the losing prize object 15A drops back to the play field, which then visually indicates to the player that the play was a losing play.

Figure 4D:
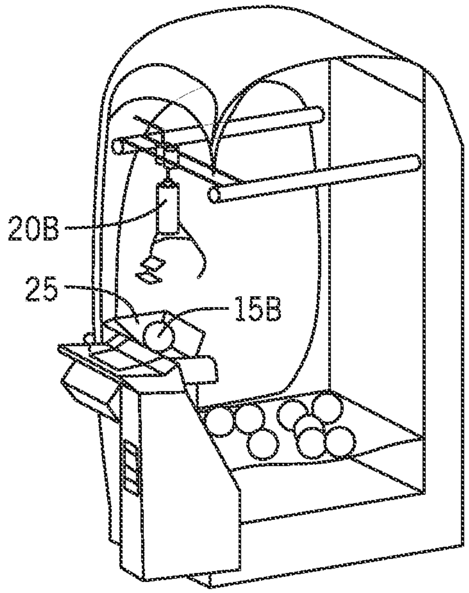

FIG. 4D illustrates an example where the play of the casino claw gaming machine 10 was determined to be a winning game. In this example, claw assembly 20B retains the winning prize object 15B until it is positioned above the shooter unit 25 based on instructions received from the field control CPU 88, and then drops the winning prize object onto the shooter unit 25. In this embodiment, this successful dropping of the winning prize object 15B onto the shooter unit 25 provides a visual indication to the player that the play was a winning play. As will be discussed in further detail below, shooter unit 25 may then verify that winning prize object 15B was successfully placed on the shooter unit 25, then return or "shoot" the ball back to the play field.

In such embodiments, the casino claw gaming machine 10 is a "closed" unit meaning the prize objects 15 are not provided to the player, rather they are returned to the play field. It is contemplated that by providing such a closed system, the casino claw gaming machine 10 will provide more security to assist in preventing fraud or cheating, which also assist in allowing such a game to operate in the heavily regulated industry of casino gaming. It is contemplated that in such embodiments, there are no access points for a player to access the interior of the cabinet, which is unlike traditional claw games or claw machines where the prize is dropped into an access point, which has been shown to allow improper access by players or spectators into the play fields of such games.

Figure 5A:
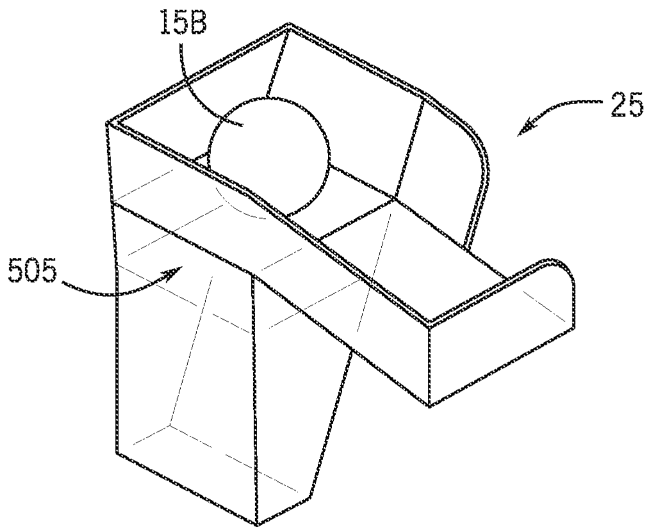
FIGS. 5A to 5C are perspective views of a shooter unit, illustrating the actions of returning a prize object to the play field, according to one embodiment of the present disclosure.
Figure 5B:
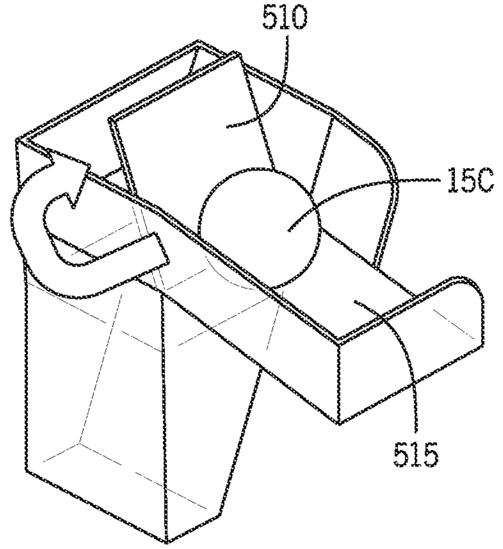
Figure 5C:
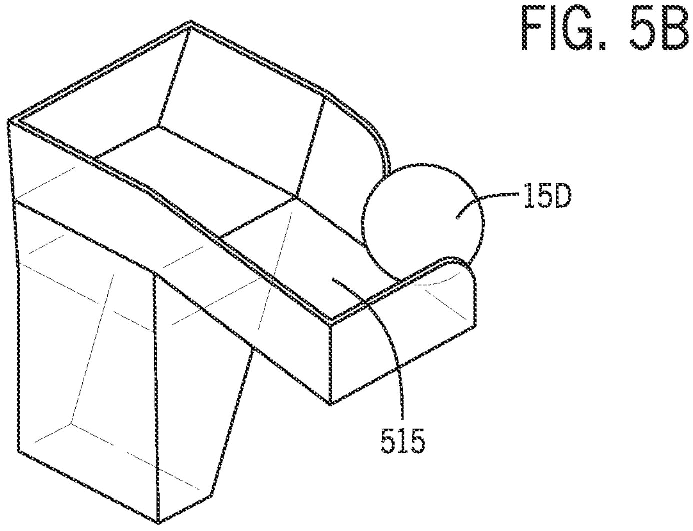

FIGS. 5A to 5C illustrate the shooter unit 25 in accordance with various embodiments. FIG. 5A illustrates a winning prize object 15B that was successfully dropped or otherwise placed on the shooter unit 25. In this example, shooter unit 25 comprises a prize object verifier generally shown at 505. In one embodiment, prize object verifier 505 is a weight sensor, which weighs the dropped prize object 15B to verify that it is a legitimate prize object. In another embodiment, prize object verifier 505 is an RFID reader which reads an RFID tag that each prize object 15 includes (not shown). In such examples, it is contemplated that incorporating several distinct verification processes, such as measuring the weight of the play field as illustrated in FIG. 3 and verifying the prize object as shown in FIG. 5A, the casino claw gaming machine 10 provides numerous resources to verify its results, which in turn may assist with it being approved as a licensed casino gaming machine. It is further contemplated that utilizing sever distinct verification processes in real time (e.g., as play is happening) will expedite the verification process, thereby decreasing the amount of dead time during a play of the claw gaming machine 10.

FIG. 5B illustrates the process of returning the prize object 15C to the field. In this example, shooter flap 510 is actuated, thereby causing prize object 15C onto the shooter ramp 515. At FIG. 5C, prize object 15D has moved down the shooter ramp and is returned to the play field, as further illustrated in FIGS. 6A to 6C.

In one embodiment, shooter flap 510 is actuated based on instruction from the field control CPU 88. In another embodiment, the field control CPU 88 receives information from prize object verifier 505, and then sends instructions to the shooter unit 25 to actuate the shooter flap 510. In a further embodiment, shooter flap 510 is actuated by a stepper motor. In another embodiment, shooter flap is actuated by a magnet. In still a further embodiment, shooter flap is assisted by a mechanical spring. It is contemplated that shooter unit 25 could comprise various mechanisms to return the prize object 15 back to the play field.

Figure 6A:
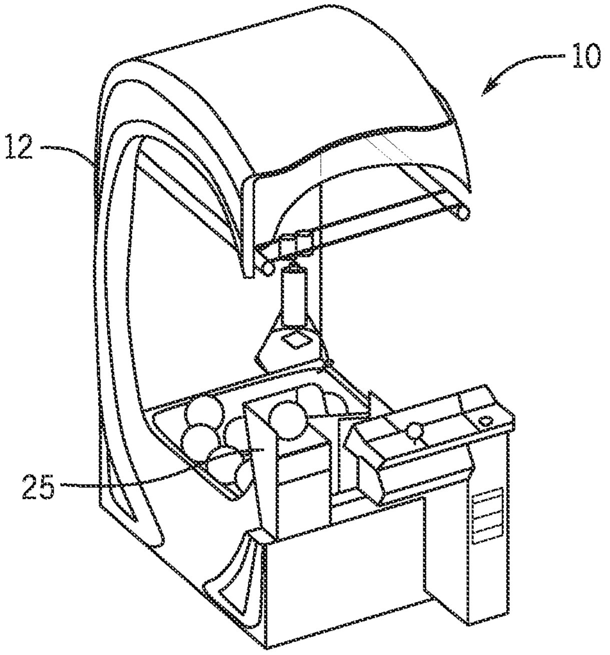
FIGS. 6A to 6C are perspective views of a casino claw gaming machine, illustrating the actions of returning a prize object to the play field, illustrating exemplary messaging, according to one embodiment of the present disclosure.
Figure 6B:
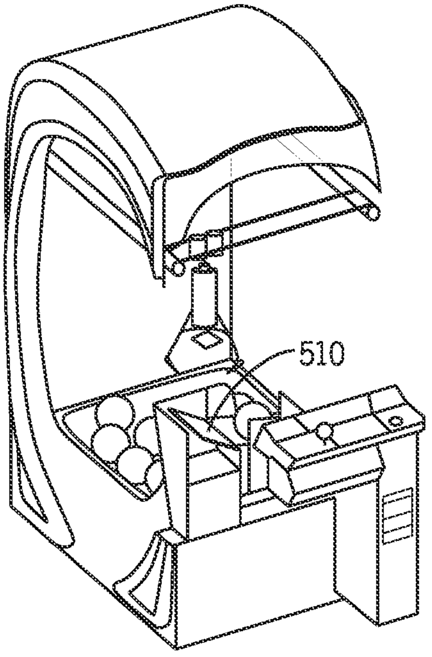
Figure 6C:
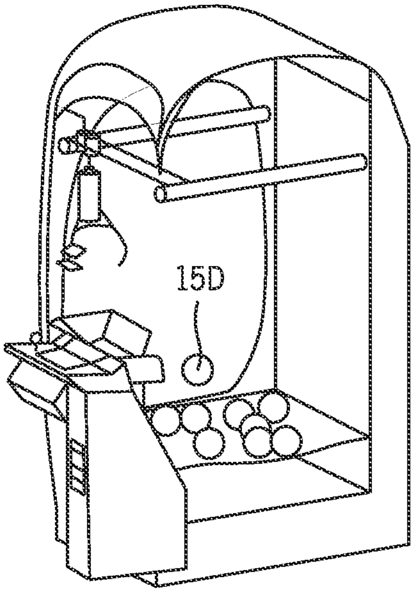

FIGS. 6A to 6C generally show the operation of the shooter unit 25 exemplified in FIGS. 5A to 5C, but in a broader context of its operation within the casino claw gaming machine 10 and associated cabinet 12. In FIG. 6A, a prize object 15 is successfully dropped onto shooter unit 25, where it is verified. FIG. 6B shows shooter flap 510 being actuated, causing the prize object 15 to return to the play field, as further illustrated in FIG. 6C where the returned prize object 15D is launched back onto the play field.

In some embodiments, the shooter unit 25 returns the prize object 15 to the play field in a manner which ensures that returned prize objects 15 do not accumulate in a particular area of the play field. For example, the shooter unit 25 may return the prize object 15 to the play field at a height which ensures that the returned prize object 15 can roll over other prize objects 15 in the play field to a resting position within the play field that is essentially random. In other embodiments, the shooter unit 25 may include a moveable guide portion that controls the direction in which the prize object 15 is returned to the play field.

Figure 7A:
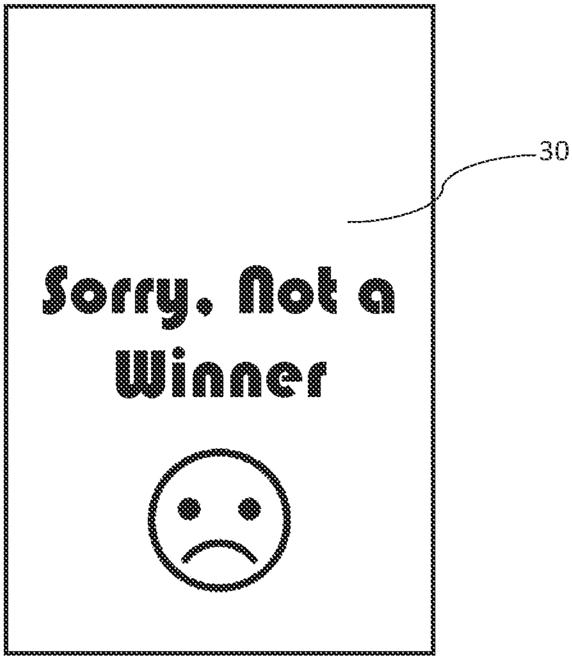
FIGS. 7A & 7B are examples of information displayed by the display device, according to one embodiment of the present disclosure.
Figure 7B:
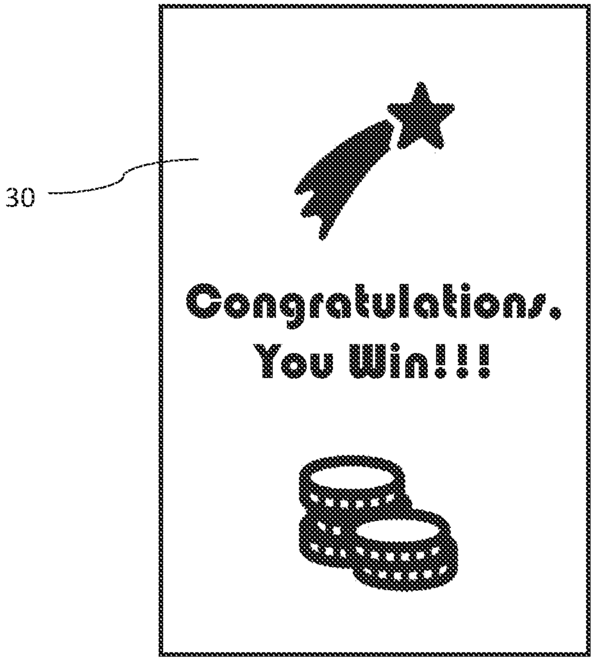

FIGS. 7A and 7B illustrate exemplary information that might be conveyed by the display device 30. FIG. 7A illustrates a message that might appear on the display device 30 when the game is determined to have a losing outcome. FIG. 7B illustrates a message that might appear on the display device 30 when the game is determined to have a winning outcome. It is further contemplated that the display device 30 can be utilized to display aspects of the actual game outcome. For example, if the game was determined to be a winning outcome, but the player failed to position the claw assembly 20 in a position where a prize award can be successfully picked up, then the display device 30 may display a game feature, for example a spin of virtual reels of a slot machine, which may then produce the winning outcome that was determined to be provided for that play of the game. Similarly, in another embodiment, to create additional excitement, the display device may be caused to display similar game features even when the game was determined to be a losing game. In such an embodiment, the purpose of displaying a game feature, even when the game has determined to provide a losing outcome, would be to prevent an expectation that each time a game feature is displayed on display device 30, the player will receive an award. In that manner, the game feature might create additional excitement as the outcome is not readily apparent to the player.

Figure 8A:
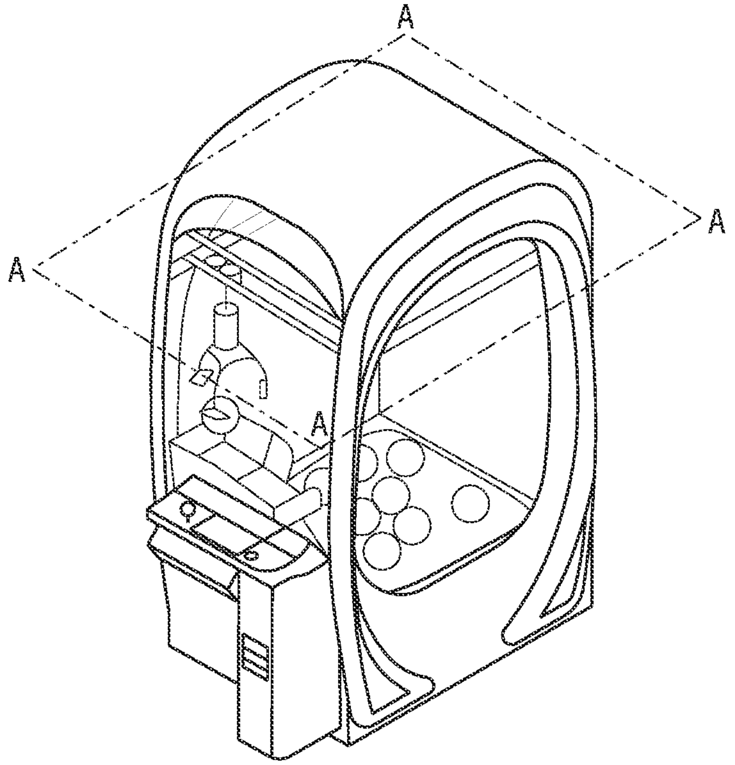
FIGS. 8A & 8B are a perspective view and associated sectional view illustrating claw tracking sensors, according to one embodiment of the present disclosure.
Figure 8B:
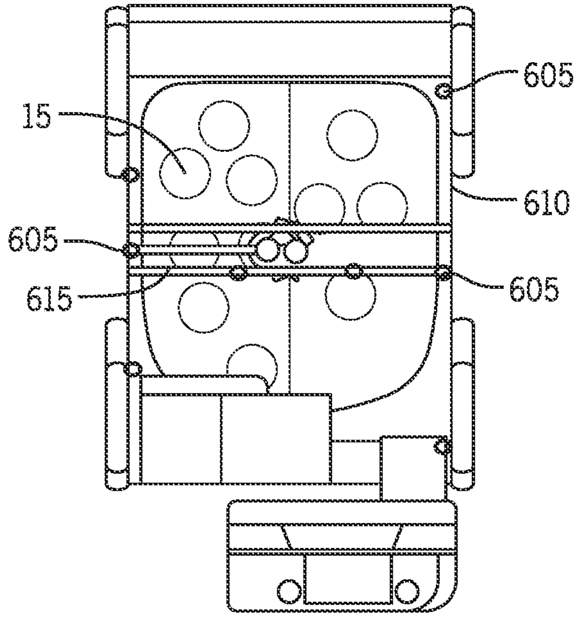

FIG. 8B is a top view of the casino claw gaming machine 10 as generally shown by dashed sectional box A-A from FIG. 8A. FIG. 8B illustrates tracks 610 and 615, that are utilized to move the claw assembly 20 relative the play field, so that the claw assembly 20 can be positioned to try and pick up a prize object 15. In the present embodiment, various optical sensors 605 are positioned along tracks 610 and 615. The optical sensors 605 are used to determine the location of the claw assembly 20 to further verify its operation and the casino claw gaming machine 10 operation. The information determined about the position of the claw assembly 20 can also be used to determine the movement of the claw assembly 20. For example, if a player was successful in picking up a prize object 15, but the game was determined to be a losing outcome, the field control CPU 88 can determine the location of the claw assembly 20, then select a release pattern for the claw assembly 20 to follow and then cause the claw assembly 20 to release the prize object 15, prior to it reaching the shooter unit 25. In such an example, the selection of the release pattern can be selected from multiple release pattern options, based at least in part on the current location of the claw assembly 20 as determined by information obtained from optical sensors 605, to provide additional suspense and entertainment around the actions of the claw assembly 20. It is contemplated that the utilization of various release patterns could increase excitement for players. For example, utilizing a release pattern where the claw assembly 20 approaches the shooter unit 25, retreats from the shooter unit 25, then approaches at a slower or faster pace, before either dropping a prize object 15 back onto the play field or the shooter unit 25, could create much more excitement than what traditional claw games or claw machines have provided. Such excitement could then increase player demand to play the casino claw gaming machine.

According to some release patterns, the field control CPU 88 may control the claw assembly 20A such that the dropping of the losing prize object 15 may be made to appear accidental to the player. For example, the field control CPU 88 may control the claw assembly 20A such that losing prize object 15 is dropped in response to a change of direction or speed by the claw assembly 20A as it travels to a position above the shooter unit 25. In another example, the field control CPU 88 may control the claw assembly 20A such that it appears that the prize object 15A is too heavy to be held by the claw assembly 20A and is thus dropped as the claw assembly 20A travels to a position above the shooter unit 25. In this manner, the player may be given the impression that the outcome of the casino claw gaming machine 10 is, to some extent, dependent on skill, despite the game outcome being determined in advance.

Figure 9A:
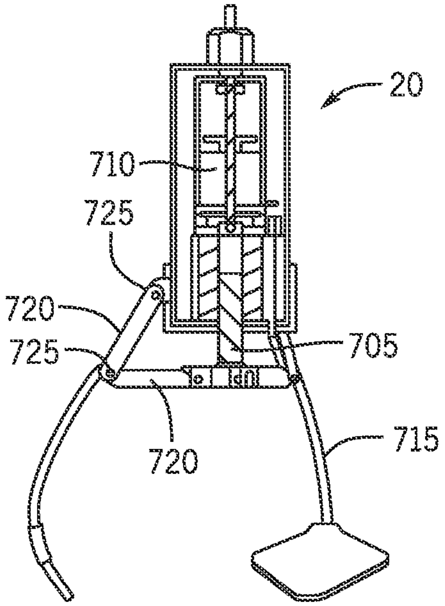
FIGS. 9A to 9C are perspective views of a claw assembly, according to one embodiment of the present disclosure.
Figure 9B:
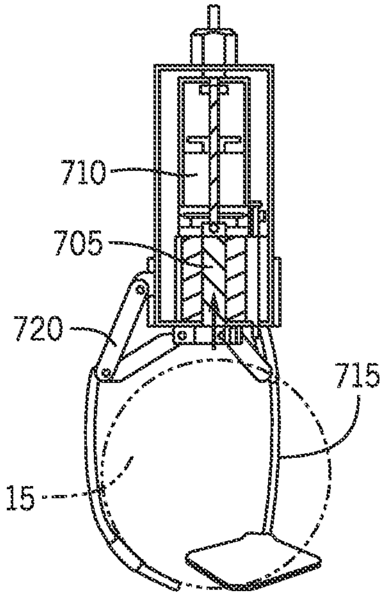
Figure 9C:
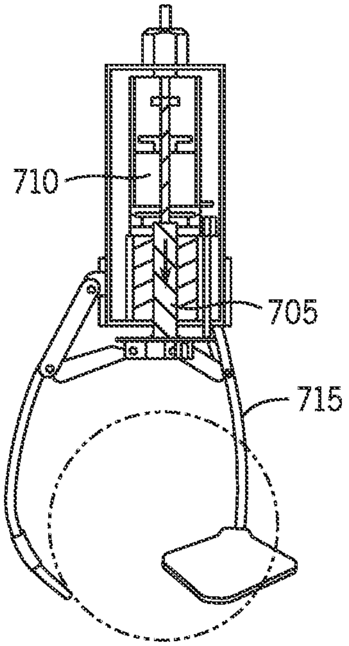
Figure 10A:
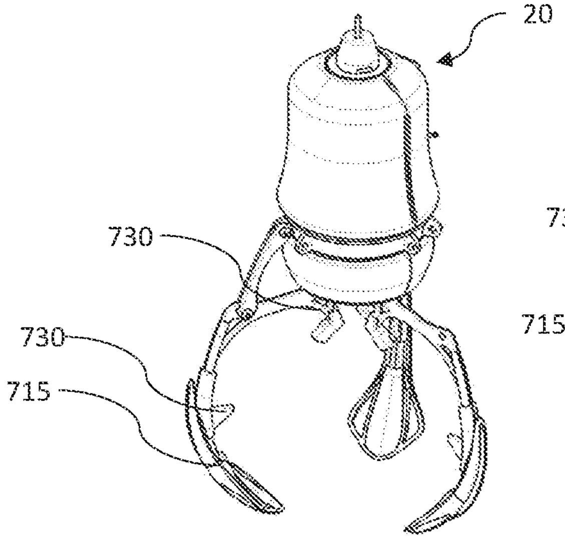
FIGS. 10A to 10D are schematic diagrams illustrating a claw assembly, according to another embodiment of the present disclosure.
Figure 10B:
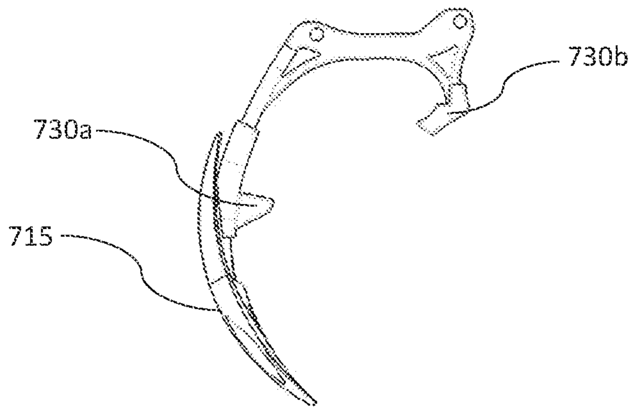
Figure 10C:
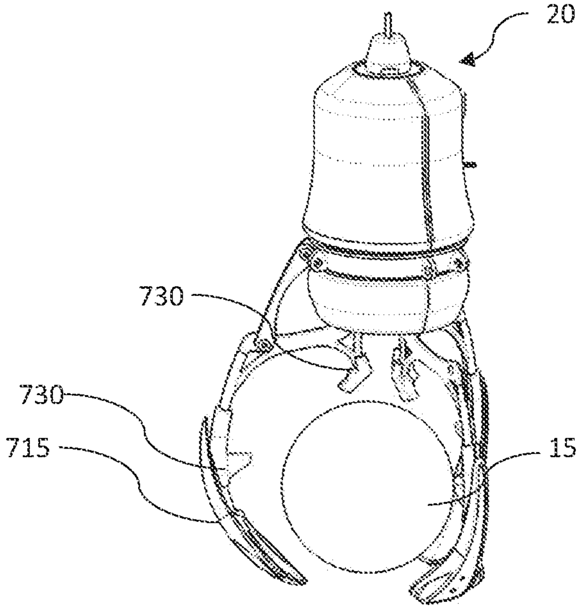
Figure 10D:
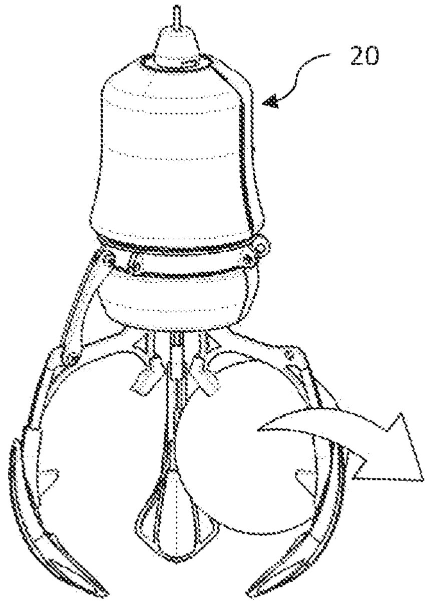

FIGS. 9A to 9C illustrate a claw assembly 20, in a partial sectional view, in accordance with one embodiment. FIG. 9A illustrates a claw assembly 20 in a neutral position, where claw arms 715 are neither in the closed or open position. FIG. 9A shows a stepper motor 710, which is connected with plunger 705. In this embodiment, stepper motor 710 provides more control over the opening and closing actions of claw assembly 20. This precision is needed in order to provide a gaming machine that allows for precise game actions. It is understood by the applicant that traditional claw games may have provided crude mechanisms for allowing a claw to lose strength, thereby dropping any prize it might have grabbed. An example of such prior mechanisms would be to supply a lower current level of electricity to the claw mechanism. But such crude mechanisms are not believed to be reliable and therefore non-verifiable, two requirements for a casino gaming machine. A stepper motor 710 is precise and used often in casino gaming machines, such as physical reel machines, so they have a history of being allowed under various casino regulations around gaming machines.

In this example, the claw assembly 20 has three claw arms 715, which are each linked by a plurality of hinged supports 720 and hinges 725. The stepper motor 710 is connected to plunger 705, which in turn is connected to a plurality of hinges 725 and hinged supports 720. In FIG. 9B, stepper motor 710 causes the plunger 705 to move up (as generally shown by the directional arrow), which causes the claw arms 715 to close, and in this example, it successfully closed around and picked up a prize object 15. FIG. 9C illustrates that stepper motor 710 causes plunger 705 to extend (as generally shown by the directional arrow), which will cause the claw arm 715 to eventually open, thereby dropping the help prize object 15.

In another embodiment, it is contemplated that in addition to or in place of stepper motor 710, a magnetic closure device could be used to provide a stronger arm closing operation. In such an embodiment, use of a magnetic closure device could provide additional operational security around the claw assembly 20. Specifically, the use of an electromagnetic configuration, with two or more magnets that when charged are forced to move in an axial manner, which by way of the magnets being coupled to plunger 705, cause the claw assembly 20 to function in a controlled manner.

FIGS. 10A to 10D illustrate a further embodiment of the claw assembly 20. According to this embodiment, the claw assembly 20 includes a plurality of protrusions 730 which are configured to prevent the claw assembly 20 from picking up a plurality of prize objects 15 at the same time. For example, in the embodiment shown in FIGS. 10A to 10D, a first protrusion 730*a* is provided on an inward facing surface of each claw arm 715 and a second protrusion 730*b* is provided at an upper end position of each claw arm 715. The first protrusion 730*a* and the second protrusion 730*b* act together to eject a prize object 15 that is not held centrally by the claw assembly 20, thereby ensuring that the claw assembly 20 can pick up only one prize object 15 at a time. In this manner, it is possible to reliably deposit a single prize object 15 in the shooter unit 25, and consequently ensure correct functioning of the casino claw gaming machine 10.

Figure 11A:
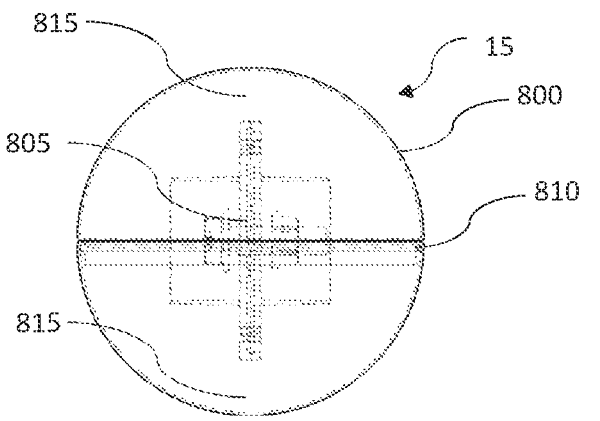
FIGS. 11A to 11C are cross-sectional diagrams illustrating a prize object, according to one embodiment of the present disclosure.
Figure 11B:
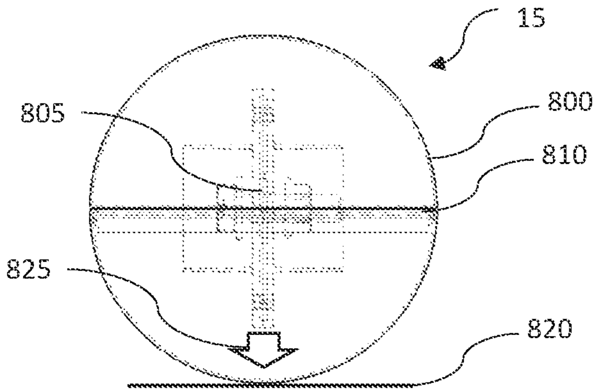
Figure 11C:
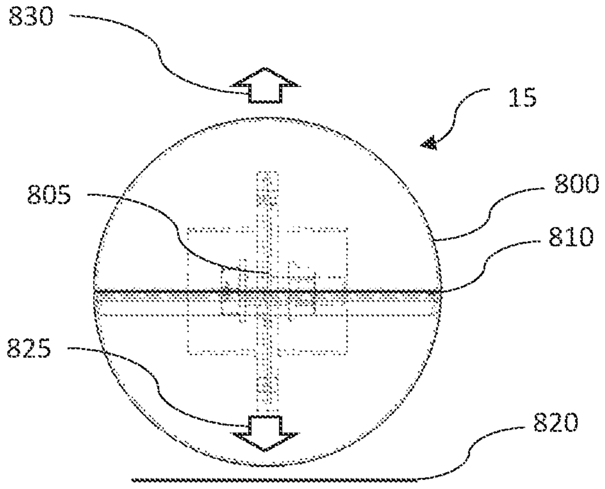

FIGS. 11A to 11C illustrate an embodiment of the prize object 15. In the present embodiment, the prize object 15 comprises a spherical shell 800 in which a weight 805 is suspended in a central position by a suspension mechanism 810. In the present embodiment, the spherical shell 800 is formed from two semi-spherical sub-shells 815 which are fitted together to enclose the weight 805 and the suspension mechanism 810. The suspension mechanism 810 holds the weight 805 in a central position with a degree of positional freedom that allows the weight to move with respect to the spherical shell 800 when subject to a force. The suspension mechanism 810 also provides a dampening effect to reduce oscillation of the weight 805 by absorption and dissipation of kinetic energy. By suspending the weight 805 in this manner, rebound by the prize object 15 after it is deposited (i.e., dropped) into the shooter unit 25 can be reduced. Specifically, as shown in FIGS. 11B, upon impact of the prize object 15 on a surface 820 (e.g., a surface of the shooter unit 25), the weight 805 continues to move in a downward direction with respect to the spherical shell 800, as indicated by arrow 825, by virtue of the suspension mechanism 810. This motion of the weight 805 absorbs some of the force of the collision between the prize object 15 with the surface 820, which in turn reduces the impact force imparted on the spherical shell 810. As shown in FIG. 11C, the lower impact force acting on the spherical shell 810 results in reduced rebound by the prize object 15 in the upward direction, as indicated by arrow 830. By reducing rebound in this manner, the likelihood that the prize object 15 bounces off the shooter unit 25 after being deposited (i.e., dropped) by the claw assembly 20 can be reduced, thereby ensuring correct functioning of the casino claw gaming machine 10. Moreover, by virtue of the suspension mechanism 810 holding the weight at the centroid of the spherical shell 800, the rolling motion of the prize object 15 is preserved.

Figure 12:
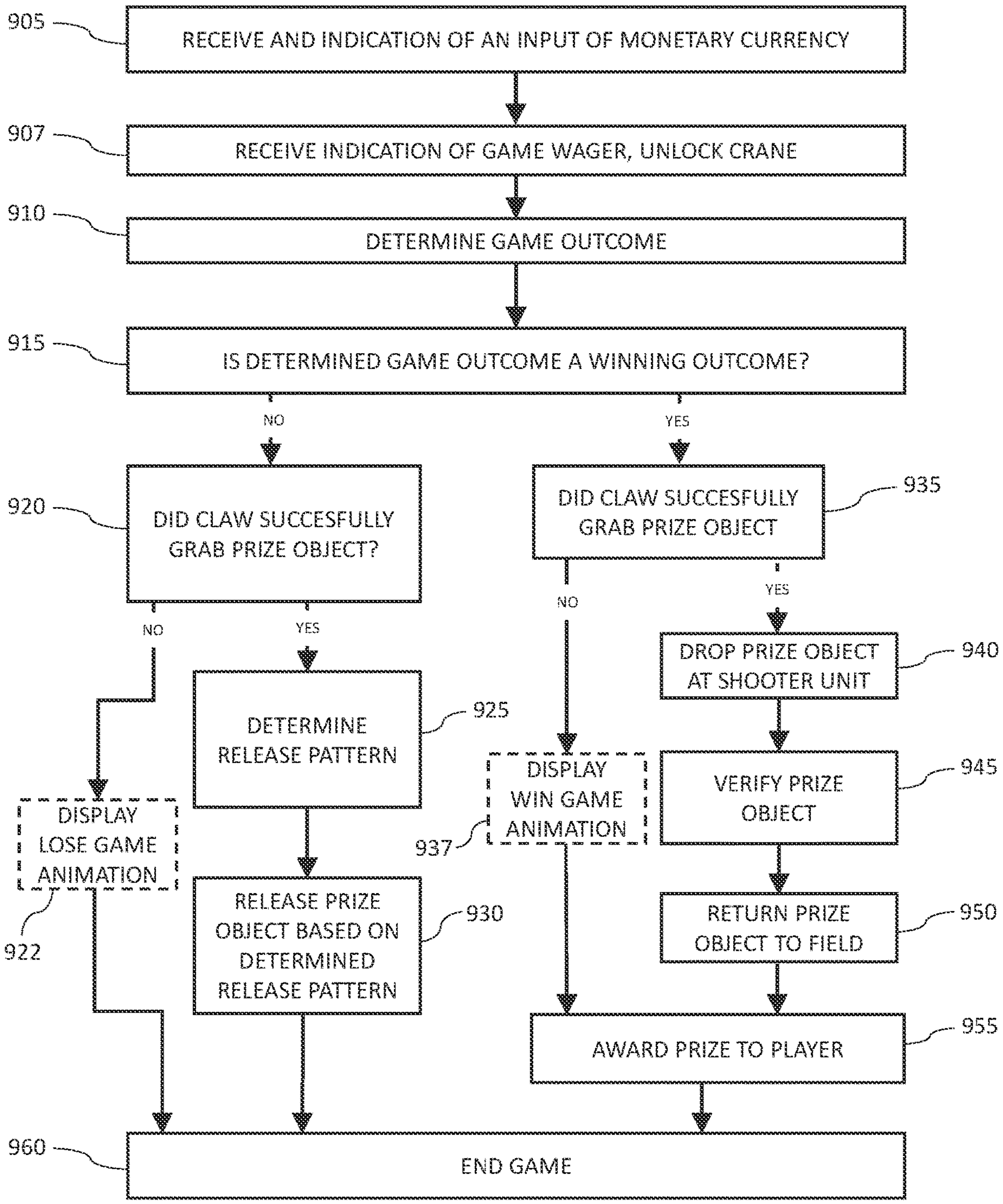
FIG. 12 is a flowchart illustrating how a casino claw game would operate, according to one embodiment of the present disclosure.

FIG. 12 is a flowchart illustrating example operation of a casino claw game played on casino claw gaming machine 10, in accordance with some embodiments. Such example operation may be implemented by software executed by a processor, such as within game control CPU 80, field control CPU 88, or other processors in communication with either or both of CPU 80 and/or CPU 88. Accordingly, the flowchart of FIG. 12 will be described in connection with FIGS. 1-11, as previously described.

Although certain steps, actions or blocks are described herein, the present disclosure is not so limited and one or more steps, actions or blocks described herein may be performed in a different order, one or more steps, actions or blocks may be omitted, and/or one or additional more steps, actions or blocks may be performed without departing from the scope of the present disclosure.

Step 905 includes receiving an indication of monetary currency input by the player from the currency acceptor 55. For example, CPU 80 may be configured to receive an indication of monetary currency being input by the player from currency acceptor 55 (see FIG. 2).

Step 907 includes receiving an indication that a wager was placed on a play of the game, which then unlocks the crane and allows the player to control the crane in an effort to position it above a prize object 15 for successful pick up. In one embodiment, the placing of a wager begins a process where the input device 45 is allowed to control the claw assembly 20 for a set amount of time, e.g., 35 seconds.

In step 910, a game outcome is determined. For example, game control CPU 80 may receive a random number or numbers determined by an RNG, and based on that received number or numbers, determine a game outcome. Such a determined game outcome could be simply a "win" outcome or a "lose" outcome. In another example, a "win" outcome could be selected from a plurality of different "win" outcomes. In this manner, it would be similar to traditional casino slot machines, where there are several different levels of winning outcomes. At step 915, it is determined whether the game outcome is a winning outcome.

When the determined outcome is not a winning outcome, the process moves to step 920, where it is then determined whether the claw assembly 20 successfully grabbed a prize object 15. At this step, and at step 935 discussed below, the casino claw gaming machine 10 utilizes information from the weight sensors 310 associated with the play field 65 to determine that a prize object 15 has been removed from the play field 65. In one embodiment, each of the prize objects 15 are substantially the same weight. In another embodiment, the various prize objects 15 have different discernable weights, or grouped into different discernable weight classifications. In this manner, the weight sensors can be used to determine which exact prize object 15, or which class of prize object 15, has been picked up. This added functionality can allow for further game variations based on the actual prize object 15 that was grabbed.

In this embodiment, after step 905 and play of a game has been initiated by a wager having been placed, the casino claw gaming machine 10 allows a player to manipulate the claw assembly 20 as discussed above. In this respect, a player's skill can be utilized to possibly pick up a prize object 15, which provides additional excitement to the player, even though it has already been decided at step 910 that the game is not a winning outcome.

If the claw assembly 20 did not successfully pick up a prize object 15, then the process moves to optional step 922, where the casino claw gaming machine 10 could display a lose game animation on display device 30. In one embodiment, the lose game animation is simply a written or video presentation informing the player that they lost. In another embodiment, the lose game animation is a game feature that purports to offer the player another chance at winning, but will result in a losing outcome.

At step 960, the current play of the game is ended, and the player is allowed to wager on another play of the game.

If at step 920, it is determined that a prize object 15 was successfully picked up the process moves to step 925, where a release pattern is determined. In this embodiment, since the outcome was determined to be a losing outcome, but a prize object 15 was successfully picked up, a release pattern is selected to control how the prize object 15 is released prior to being dropped at the shooter unit 25, which would typically indicate a win for the player. In one example, there are a plurality of release patterns that the game control CPU 80 and/or field control CPU 88 selects from. Such a selection could be random, in order from a listing whereby one release pattern is selected, then next time the next release pattern in the listing is selected, and so on. In a further embodiment, the selection of the release pattern is based at least in part of the position of the claw assembly 20, which in turn is determined from the optical sensors 605. In such an embodiment, it is contemplated that different locations of the claw assembly 20 allow for different, or different subsets, of release patterns.

At step 930, the prize object 15 is dropped based on the determined release pattern from step 925, and then the game ends at step 960.

If at step 915 it is determined that the outcome is a winning outcome, then the process moves to step 935 to determine if a prize object 15 was successfully grabbed. Similar to step 920, the casino claw gaming machine 10 utilizes information from the weight sensors 310 associated with the play field 65 to determine that a prize object 15 has been removed from the play field 65.

If a prize object 15 was not grabbed, then the process can move to optional step 937 to provide a win game animation on display device 30. In this embodiment, since the game was determined to be a winning game outcome, but the player was not successful in picking up a prize object 15, the game must nevertheless provide the winning game outcome to the player. In this example, the casino claw gaming machine 10 may provide an alternate game feature via display device 30, such as a spin of virtual slot machine reels, the spin of a video wheel, or any other game feature that then displays a winning game outcome for the player.

The process then moves to step 955 of awarding a prize to the player based on the winning game outcome, and then ends the game at step 960. A prize can be based on the number of credits initially wagered by the player, and can be based on the type of win determined by the casino claw gaming machine 10. For example, the player could have wagered $1.00 on the play of the game, and the winning outcome could have been determined to be a 20× multiplier applied to the initiating game wager, thereby providing the player with an award of $20.00.

If at step 935 it is determined that the player was successful at grabbing a prize object 15, then the game causes the prize object 15 to be dropped at the shooter unit 25, as illustrated in step 940. Once dropped at shooter unit 25, the prize object 15 is verified at step 945, and as discussed in regards to FIG. 5A. the prize object 15 is then returned to the play field 65 at step 950, and the process then moves to step 955 of awarding a prize to the player based on the winning game outcome, and then ends the game at step 960. Alternatively, while not expressly shown in FIG. 12, it is contemplated that after it is determined that the player was successful at grabbing a prize object 15 at step 935, but prior to the prize object 15 being dropped at the shooter unit 25, so prior to step 940, the prize object 15 may nevertheless be dropped due to various unintended causes (e.g., the successful grabbing of the prize object 15 was not completely secure, etc.), in which case the process illustrated after step 935 would switch as though it was determined that the prize object 15 was not successfully grabbed.

Another alternative embodiment, not expressly shown if FIG. 12, contemplates that the player is allowed the full allotted time to attempt to pick up prize objects 15. In such an embodiment, process illustrated in FIG. 12 would allow numerous repeats of the steps. For example, if the determined outcome is a winning outcome at step 915, then the illustrated processes at steps 937 and 950 would return to step 935 before eventually proceeding to step 955. Similarly, if the determined outcome was a losing outcome at step 915, then the illustrated processes at steps 922 and 930 would return to step 920 before proceeding to step 960. In such an example, such processes would continue upon the expiration of the allotted time. In a further variation of this example, it is contemplated that the step of 955 is the awarding of a single symbol out of a plurality of symbols that the player is trying to obtain within an allotted time, to form a winning combination of symbols, and further disclosed herein.

Figures 13, 14:
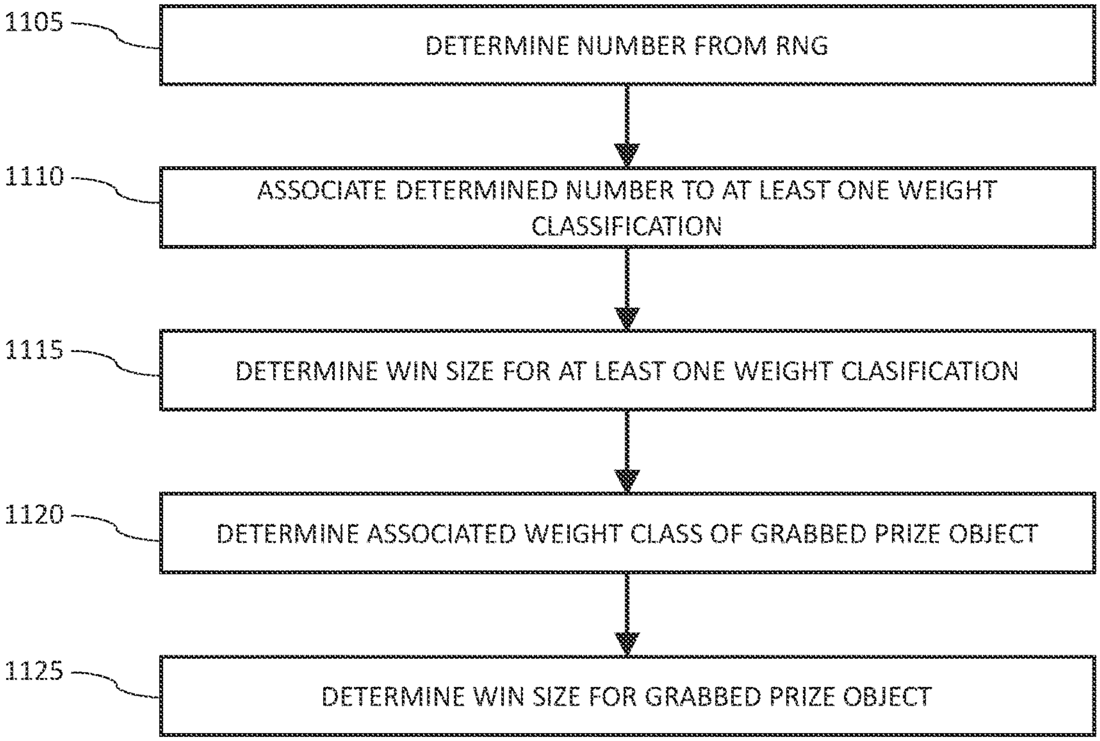
FIG. 13 is a table illustrating how game outcomes might be associated with different prize objects, according to one embodiment of the present disclosure.
FIG. 14 is a flowchart illustrating how a casino claw game would operate, according to another embodiment of the present disclosure.

FIGS. 13 and 14 illustrate an alternative embodiment where the prize objects 15 are different weights. In this embodiment, the table illustrated in FIG. 13 provides different weights of the prize awards and their associated probabilities of providing awards based on a determined random number. These numbers and table are simply to provide an example of what this might look like, and are not meant to be the only prize matrix applicable to the present disclosure. It is further contemplated that in this embodiment, each of the prize objects 15 looks visually the same, so that a player could not attempt to create an advantage by trying to pickup only certain of the prize objects 15. However, it is further contemplated that another embodiment could provide discernable differences between different classes of prize objects 15, as any prize that may be awarded is still predominantly derived from a random determination.

The flowchart illustrated at FIG. 14 illustrates the process by which the table of FIG. 12 could be implemented in one embodiment. Specifically, the game determines the RNG at step 1105, associates the RNG with the various weight classes at step 1110, and determines which win sizes are associated with which weight classes at step 1115. Then at step 1120, the game determines the weight of any successfully grabbed prize object 15, and then determines any associated prize at step 1125 based on these steps.

Consecutive Losing Games

Another improvement to traditional claw games or claw machines contemplated is the ability to track consecutive losses, and if a preset number of consecutive losses is reached in plays of the casino claw game, automatically provide the player an award or an ability to win an award. In one embodiment, the casino claw game could be programmed to always apply the same consecutive losses number, e.g., 75 consecutive losses. In another example, casino claw game 10 randomly determines a consecutive losses number between two numbers, e.g., 50 to 100 games. In each case, if the number of consecutive losses reaches the number programmed or otherwise selected by the casino claw game, the player is automatically provided with an award or an ability to win an award. For example, a player may win an automatic ten credits if the consecutive losses reaches the selected number. In another example, a player might be awarded a spin of video slot machine reels on the display device 30 if the consecutive loss number is reached. In a further embodiment, if the consecutive losses number is reached, the game selects a new or different consecutive losses number for subsequent plays.

Hybrid Casino Claw Gaming Machine

Figure 15:
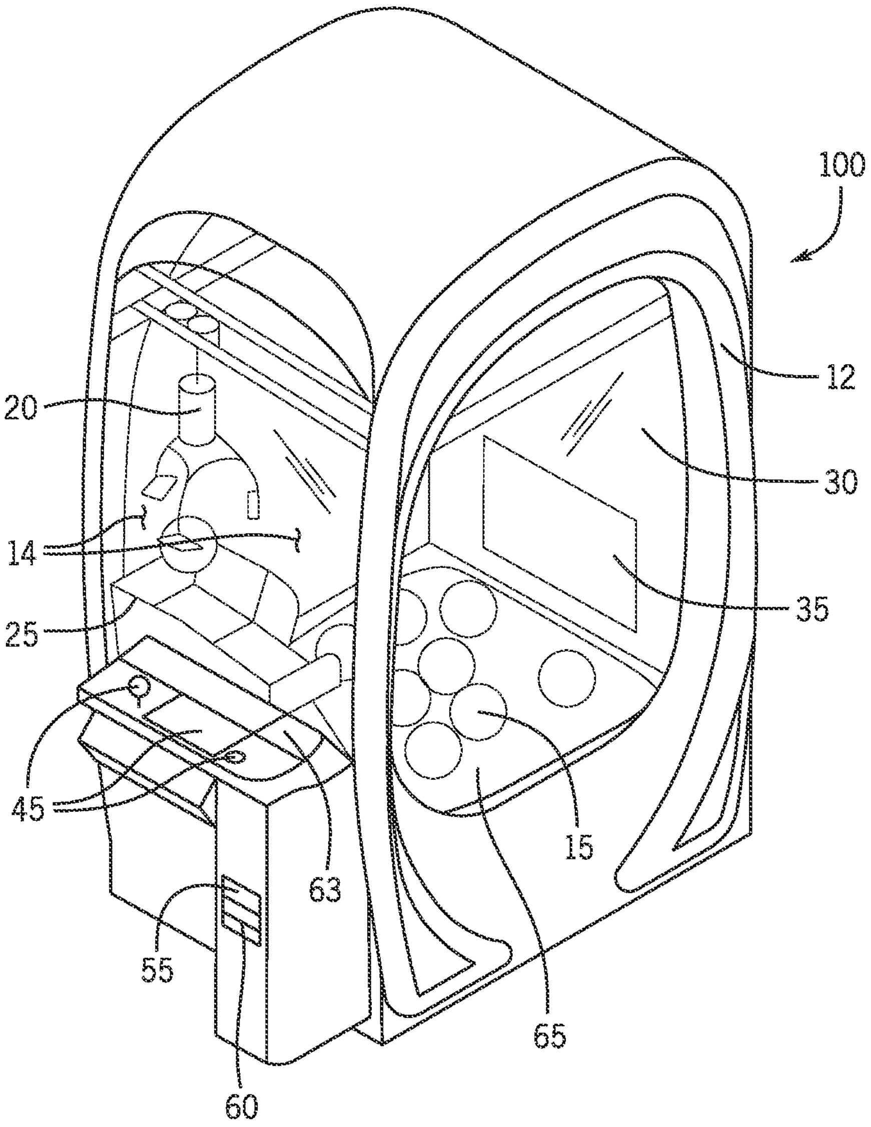
FIG. 15 is a perspective view of a hybrid casino claw gaming machine, according to one embodiment of the present disclosure.

FIG. 15 illustrates a hybrid casino claw gaming machine 100 according to an embodiment of the present disclosure.

The hybrid casino claw gaming machine 100 combines a base game with a bonus claw game, as described in further detail below. The physical components of the hybrid casino claw gaming machine 100 shown in FIG. 15 are substantively the same as those of the casino claw gaming machine 10 described above with reference to FIGS. 1 to 14, so a detailed description of these physical components has been omitted for brevity and concision.

In general terms, the hybrid casino claw gaming machine 100 involves two levels of play: a first level of play in which the player places a wager in the base game, and a second level of play in which the bonus claw game is activated upon satisfaction of a bonus claw game start condition in the base game.

In the present embodiment, the base game is a virtual slot machine game 35 that is presented on the display device 30 as shown in FIG. 15. The virtual slot machine game 35 comprises three or more virtual reels, with each reel comprising a plurality of symbol types. In each play of the base game, the outcome is determined randomly in accordance with an approved RTP for the hybrid casino claw gaming machine 100. When the outcome of the base game corresponds to the bonus claw game start condition (e.g., a specific combination of symbol types arranged on a specific payline), the bonus claw game is activated as described in further detail below.

Figure 16:
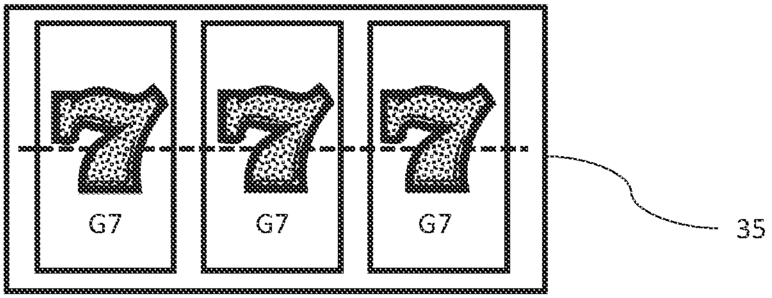
FIG. 16 is an example of information displayed by the display device, according to one embodiment of the present disclosure.

In the present embodiment the virtual slot machine game 35 comprises three virtual reels and the bonus claw game start condition corresponds to three gray "7" symbols (hereinafter abbreviated as "G7 symbols") arranged on a payline, as shown in FIG. 16. In FIG. 16 and subsequent drawings, the G7 symbols are represented as "7" symbols filled with a dot pattern. Alternative bonus claw game start conditions may be contemplated, such as conditions corresponding to different symbol types, or conditions which do not involve a payline. For example, the bonus claw game start condition may correspond to a scatter condition wherein a specific number of symbols or a particular symbol type are displayed on the virtual reels.

Figure 17:
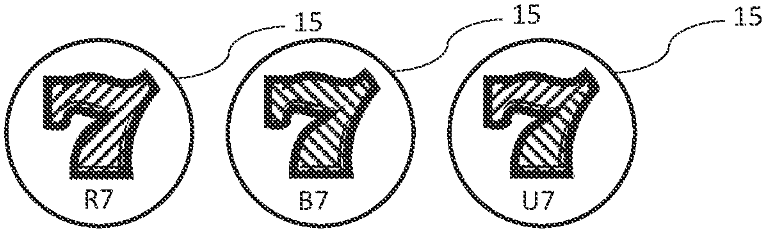
FIG. 17 is a schematic diagram of winning objects in a hybrid casino claw game, according to one embodiment of the present disclosure.

In a similar manner, each of the prize objects 15 in the hybrid casino claw gaming machine 100 corresponds to a red "7" symbol (hereinafter abbreviated as an "R7 symbol"), a blue "7" symbol (hereinafter abbreviated as a "B7 symbol") or a universal "7" symbol (hereinafter abbreviated as a "U7 symbol") which can function as both an R7 symbol and a B7 symbol depending on game context. Each of the prize objects 15 may be colored or decorated according to its corresponding symbols. In particular, each of the prize objects 15 may be decorated with either an R7 symbol, a B7 symbol or a U7 symbol, as shown in FIG. 17. In FIG. 17 and subsequent drawings, the R7 symbols are represented as "7" symbols filled with a first diagonal hatch pattern (hatched diagonally from lower-left to upper-right); the B7 symbols are represented as "7" symbols filled with a second diagonal hatch pattern (hatched diagonally from lower-right to upper-left); and the U7 symbols are presented as "7" symbols partially filled with each of the first diagonal hatch pattern and the second diagonal hatch pattern. Upon satisfaction of the bonus claw game start condition in the base game, the CPU 80 determines a winning combination of the R7, B7 and G7 symbols before activating the bonus claw game itself. The particular combination R7, B7 and G7 symbols forming the winning combination in the bonus claw game may be determined randomly by the CPU 80 in accordance with an approved RTP for the hybrid casino claw gaming machine 100. To enable discrimination between the R7, B7 and U7 prize objects 15, the prize objects 15 may have different weights. That is, prize objects 15 corresponding to the R7 symbol may have a weight that is different from the weight of prize objects 15 corresponding to the B7 symbol, and prize objects 15 corresponding to the U7 symbol may have a weight that is different from the weight of prize objects 15 corresponding to both the R7 and B7 symbols. Thus, the symbol corresponding to a prize object 15 picked up by the claw assembly 20 can be determined on the basis of information received from the weight sensors 310.

FIGS. 18A to 18D show examples of winning combinations in accordance with the present embodiment. FIG. 18A shows a first winning combination comprising three R7 symbols; FIG. 18B shows a winning combination comprising three B7 symbols; FIG. 18C shows a winning combination comprising any mixed combination of three R7 and B7 symbols (i.e., one R7 symbol and two B7 symbols, or one B7 symbol and two R7 symbols, in any order); and FIG. 18D shows a winning combination comprising any mixed combination of two R7 and B7 symbols (i.e., one R7 symbol and one B7 symbol, or two R7 symbols, or two B7 symbols, in any order). In the present embodiment, the winning combination shown in FIG. 18A may provide the highest payout, with the payouts provided by the winning combinations shown in FIGS. 18B, 18C and 18D decreasing in amount.

In the present embodiment, the winning combination determined for the bonus claw gaming machine 100 also determines the payout to the player from the bonus claw game. That is, the bonus claw game is configured such that played is guaranteed to receive a payout corresponding to the determined winning combination, irrespective of the skill of the player or the actual performance of the player in the bonus claw game. For example, if the winning combination determined by the CPU 80 is three R7 symbols, the player is guaranteed to receive a payout corresponding to this winning combination, irrespective of the player's actual performance in the bonus claw game. However, as discussed in more detail below, the bonus claw game may be configured to give the player the impression that the outcome and thus the payout of the bonus claw game is dependent at least in part on the skill of the player, thereby increasing excitement and enjoyment for the player.

In general terms, the nominal objective of the bonus claw game as perceived by the player, is to use the claw assembly 20 to pick up prize objects 15 corresponding to a winning combination and deposit the picked-up prize objects 15 in the shooter unit 25. For example, knowing that a combination of three R7 symbols provides the highest payout, the player may attempt to manipulate the claw assembly 20 to pick up prize objects 15 decorated with the R7 symbol by controlling the claw assembly 20 using the input device 45. The player may determine to pick up prize objects 15 decorated with the R7 symbol in expectation that that three R7 symbols would provide the highest payout, even though the actual winning combination determined by the CPU 80 may be a different combination of symbols that is unknown to the player.

If the player successfully manipulates the claw assembly 20 to pick up a prize object 15, the CPU 80 may identify the symbol corresponding to the prize object 15. For example, the CPU 80 may identify the symbol corresponding to the picked-up prize object 15 by measuring the weight of the play field 65 using information from the weight sensors 310, or a weight sensor incorporated into the claw assembly 20. In other embodiments, technologies such as RFID or computer vision may be used to identify the symbol corresponding to the prize object 15, as an alternative or in addition to the weight sensors 310. After determining the symbol corresponding to the picked-up prize object 15, the CPU 80 determines whether the determined symbol forms part of the winning combination determined prior to activation of the bonus claw game. If the symbol corresponding to the picked-up prize object 15 forms part of the winning combination, the CPU 80 allows the player to move the claw assembly 20 to a position above the shooter unit 25 and deposit the prize object 15. Conversely, if the symbol corresponding to the picked-up prize object 15 does not form part of the winning combination, the CPU 80 controls the claw assembly 20 to release the prize object 15, thereby preventing the player from depositing the prize object 15 in the shooter unit 25. In some embodiments, the CPU 80 may control the claw assembly 20 to release the prize object 15 in accordance with a release pattern as discussed in more detail above. In this manner, the CPU 80 can ensure that only prize objects 15 forming part of the determined winning combination are deposited in the shooter unit 25, irrespective of the skill of the player.

As discussed above, the U7 symbol may function as either an R7 or a B7 symbols, depending on context. That is, a prize object 15 corresponding to the U7 symbols can function as either an R7 or a B7 symbol to form part of determined winning combination. Thus, for example, in a case in which the winning combination is three R7 symbols, this winning combination may be satisfied by picking up any combination of three prize objects 15 corresponding R7 and/or U7 symbols.

Each time a prize object 15 is deposited in the shooter unit 25, the CPU 80 may update the display device 30 to indicate that the deposited prize object 15 forms part of the determined winning combination. For example, the CPU 80 may change a G7 symbol in the virtual slot machine game 35 to an R7 symbol, a B7 symbol or a U7 symbol, depending on the symbol corresponding to the deposited prize object 15. In the case of a U7 symbol, the G7 symbol may be changed to an R7 symbol or a B7 symbol in accordance with the winning combination at the time that the corresponding prize object 15 is deposited in the shooter unit 25. Alternatively, the G7 may be initially changed to a U7 symbol at the time that the corresponding prize object 15 is deposited in the shooter unit 25, and later changed to either an R7 symbols or a B7 symbol when the final outcome of the bonus claw game is revealed to the player (e.g., using a particular win game animation or the like). In the latter case, the delay between depositing the prize object 15 corresponding to the U7 symbol and the revealing of the function of the U7 symbol in the winning combination may create a sense of suspense and anticipation for the player.

If the player is able to pick up and deposit prize objects 15 corresponding to symbols forming the determined winning combination, the CPU 80 ends the bonus claw game informs the user that they will receive a payout corresponding to the winning combination. This may be performed using an appropriate win game animation presented on the display device 30.

In some embodiments, the player may be allowed to deposit prize objects 15 in the shooter unit 25 until a prescribed condition has occurred. In certain embodiments, the prescribed condition that occurs may be a prescribed time period (e.g., 60 seconds) in which to deposit prize objects 15 in the shooter unit 25 expires or elapses. Alternatively, the prescribed condition that occurs may be a prescribed number of attempts at depositing prize objects 15 in the shooter unit 25 being reached. In the event that prescribed condition occurs before the player is able to form the determined winning combination (e.g., the prescribed time period expires or elapses or the prescribed number of attempts is reached), control of the claw assembly 20 is locked and CPU 80 controls the display device 30 to display a win game animation in which the reels in the virtual slot machine game 35 are changed to the determined winning combination and a payout corresponding to the winning combination is made to the player. That is, even if the player is not able to pick up and deposit prize objects 15 forming the winning combination within the prescribed time period of the prescribed number of attempts, the play will still receive the payout corresponding to the winning combination by virtue of the win game animation.

Figure 19:
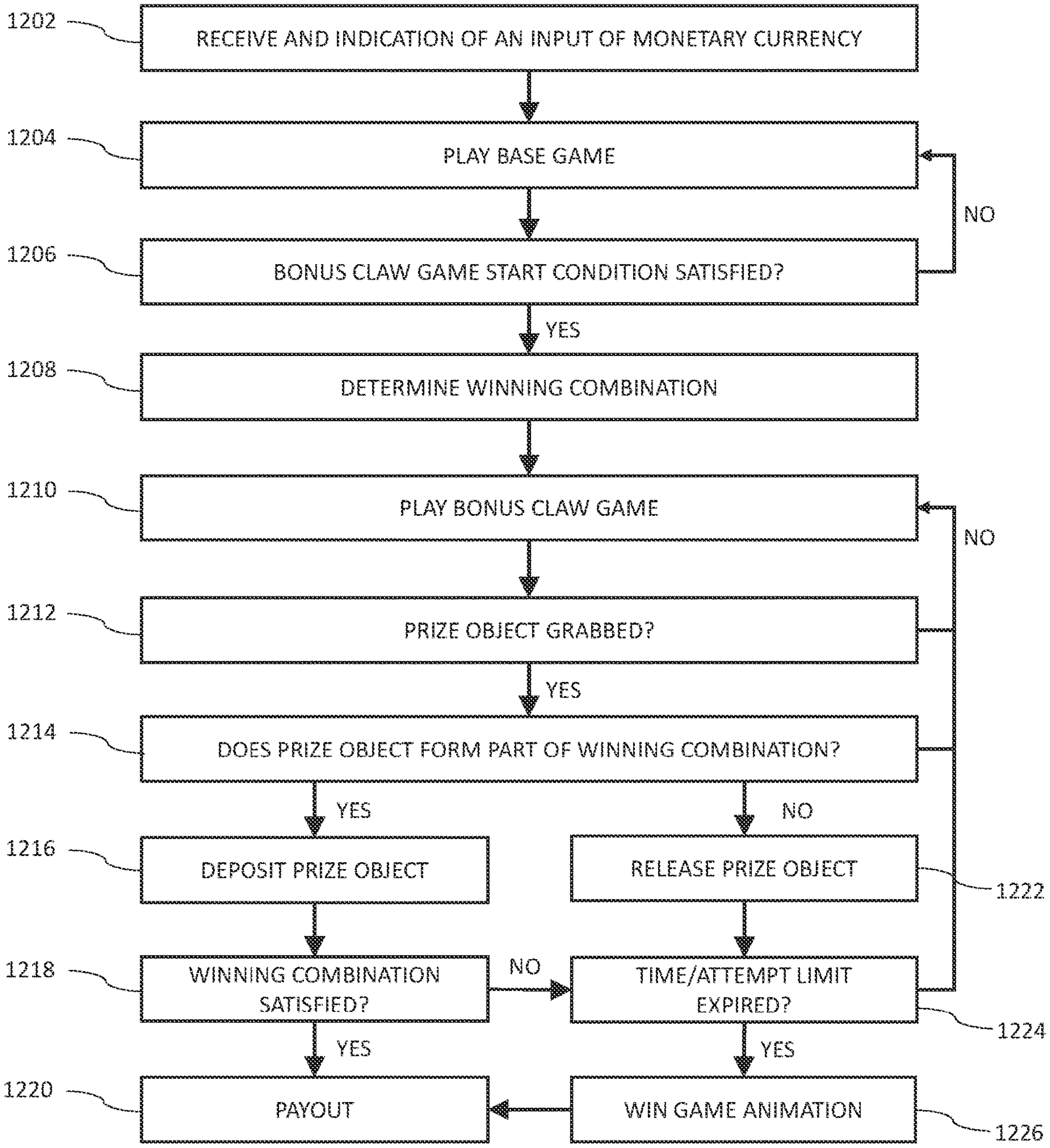
FIG. 19 is a flow chart illustrating operation of a hybrid casino claw game, according to one embodiment of the present disclosure.

FIG. 19 is a flowchart illustrating an example operation of a hybrid casino claw gaming machine 100 in accordance with an embodiment. Such example operation may be implemented by software executed by a processor, such as the game control CPU 80, field control CPU 88, or other processors in communication with either or both of CPU 80 and/or field control CPU 88. Accordingly, the flowchart of FIG. 18 will be described in connection with FIGS. 1 to 11 and 15 to 18 as previously described.

Although certain steps, actions or blocks are described herein, the present disclosure is not so limited and one or more steps, actions or blocks described herein may be performed in a different order, one or more steps, actions or blocks may be omitted, and/or one or additional more steps, actions or blocks may be performed without departing from the scope of the present disclosure.

In step 1202 an indication of monetary currency input by the player is received from the currency acceptor 55. For example, CPU 80 may be configured to receive an indication of monetary currency being input by the player from the currency acceptor 55 (see FIG. 2).

In step 1204, the player plays the base game based on the monetary currency amount received in step 1202. In the present embodiment, the player plays the virtual slot machine game 35 by spinning the three virtual reels shown in the display device 30.

In step 1206, the CPU 80 determines whether the bonus claw game start condition has been satisfied in the base game. That is, in the present embodiment the CPU 80 determines whether the outcome of the base game is three G7 symbols arranged on a payline as shown in FIG. 16. In the event that the bonus claw game start condition has been satisfied (i.e., "YES" in step 1206) the operation proceeds to step 1208. In the event that the bonus claw game start condition has not been satisfied (i.e., "NO" in step 1206), the operation returns to step 1204, and the base game continues.

In step 1208, the CPU 80 determines the winning combination for the bonus claw game using the RNG and in accordance with the approved RTP for the hybrid casino claw gaming machine 100. After the winning combination has been determined, the bonus claw game is started, and the player is given control of the claw assembly 20 in step 1210.

In step 1212, the CPU 80 determines whether the player has successfully picked up a prize object 15 using the claw assembly 20. As discussed above, this determination may be based on information received from the weight sensors 310 positioned below the play field 65 or a weight sensor incorporated in the claw assembly 20 itself. In the event that a prize object 15 has been picked up (i.e., "YES" in step 1212) the operation proceeds to step 1214. In the event that a prize object 15 has not been picked up (i.e., "NO" in step 1214), the operation returns to step 1210 and the bonus claw game continues.

In step 1214, the CPU 80 determines whether the picked-up prize object 15 forms part of the winning combination determined in step 1208. In the present embodiment, this includes identifying the symbol associated with the picked-up prize object 15 and then determining whether the identified symbol forms part of the determined winning combination. As discussed above, identification of the symbol associated with the picked-up prize object 15 may be based on information from the weight sensors 310, or a weight sensor incorporated into the claw assembly 20.

Upon determining that the picked-up prize object 15 forms part of the winning combination, the CPU 80 allows the player to deposit the picked up prize object 15 in the shooter unit 25 and optionally updates the display device 30 to indicate that the deposited prize object 15 forms part of the determined winning combination in the manner described above. Conversely, if it is determined that the picked-up prize object 15 does not form part of the winning combination, the CPU 80 controls the claw assembly 20 to release the prize object 15 in accordance with a selected release pattern, as described above, in step 1222.

After the prize object 15 has been deposited in the shooter unit 25 in step 1216, the CPU 80 determines whether the winning combination is satisfied in step 1218. If the winning combination is satisfied (i.e., "YES" in step 1218), the CPU makes the corresponding payout to the player in step 1220. It should be appreciated that when the prize object 15 that has been deposited in the shooter unit 25 in step 1216, the shooter unit may also verify whether the prize object 15 is a legitimate prize object according to any of the verification procedures discussed herein.

In the event that the picked-up prize object 15 was released (i.e., step 1222) or it was determined that the winning combination is not yes satisfied (i.e., "NO" in step S1218), the CPU 80 proceeds to determine whether a prescribed condition has occurred at step 1224. The prescribed condition occurring may be a prescribed time period expiring or elapsing, or a prescribed number of attempts to deposit the prize object 15 on the shooter unit 15 being reached. If the prescribed condition has occurred (e.g., the prescribed time period has expired or the prescribed number of attempts to deposit the prize object 15 on the shooter unit 15 has been reached), the CPU 80 controls the display device 30 to show the win game animation as described above in step 1226 and then proceeds to step 1220 to make the payout to the player. If the prescribed condition has not occurred (e.g., the prescribed time period has not expired or the prescribed number of attempts to deposit the prize object 15 on the shooter unit has not been reached), the operation returns to step 1210 and the bonus claw game continues.

Figure 20:
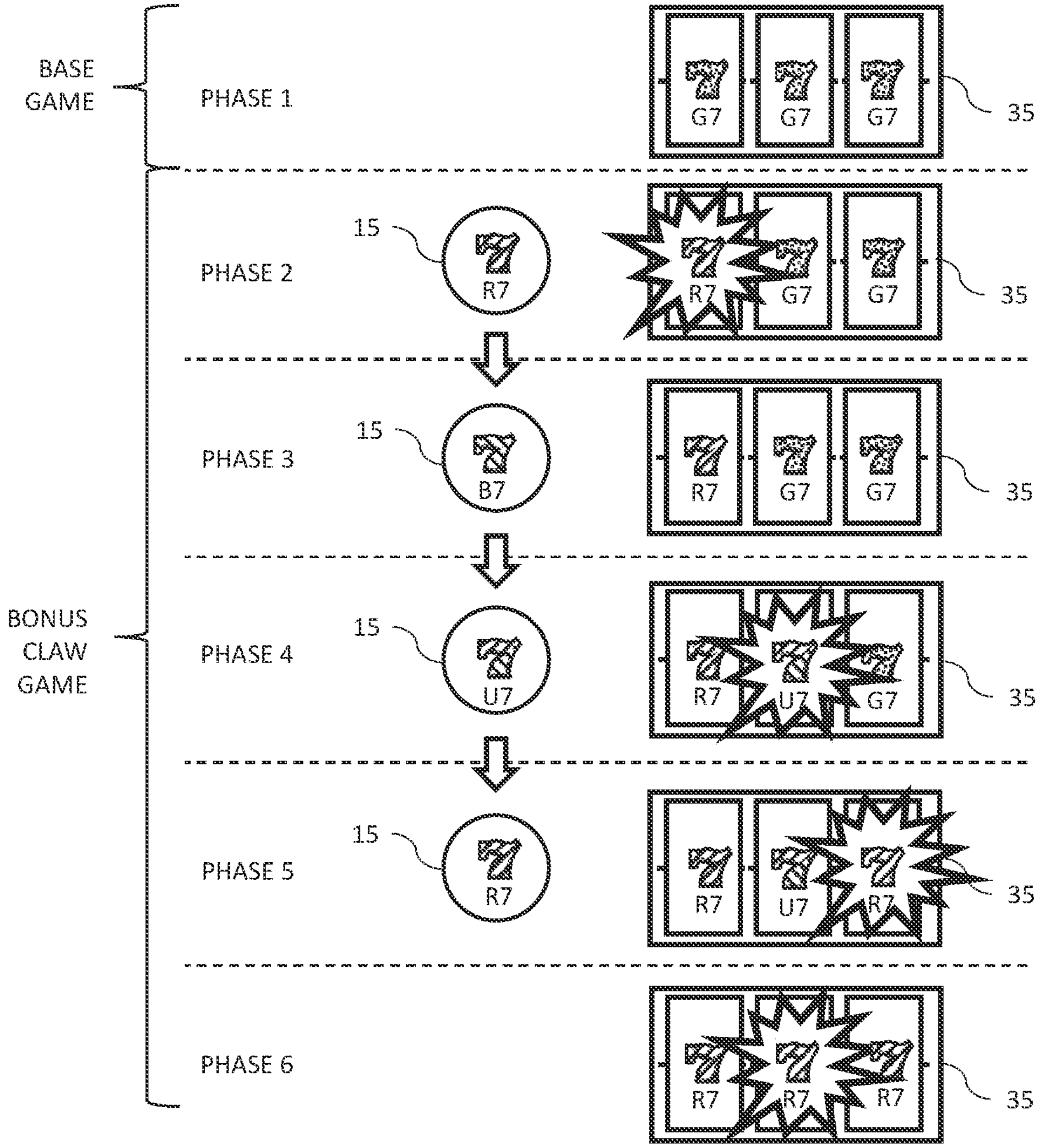
FIG. 20 is a first example of a game flow in a hybrid casino claw game, according to one embodiment of the present disclosure.

FIG. 20 shows a first example of a game flow in the hybrid casino claw gaming machine 100, according to an embodiment of the present disclosure. According to the first example, the bonus claw game start condition is satisfied in the base game by virtue of three G7 symbols being arranged on the payline in the virtual slot machine game 35 (PHASE 1). Upon satisfaction of the bonus claw game start condition, the CPU 80 determines the winning combination and activates the bonus claw game. In this example, the winning combination is three R7 symbols. Next, the player successfully picks up a prize object 15 corresponding to an R7 symbol, and the CPU 80 determines that the picked-up prize object 15 forms part of the winning combination. Accordingly, the CPU 80 allows the player to deposit the prize object 15 in the shooter unit 25 and controls the display device 30 to change the G7 symbol in the first (left) virtual reel to an R7 symbol (PHASE 2). Next, the player successfully picks up a prize object 15 corresponding to a B7 symbol and the CPU determines that the picked-up prize object 15 does not form part of the winning combination and thus controls the claw assembly 20 to drop the prize object 15 without updating the virtual reels (PHASE 3). Next, the player successfully picks up a prize object 15 corresponding to a U7 symbol and the CPU determines that the picked-up prize object 15, functioning as an R7 symbol, can form part of the winning combination, and thus allows the player to deposit the prize object 15 in the shooter unit 25 and controls the display device 30 to change the G7 symbol in the second (middle) virtual reel to a U7 symbol (PHASE 4). Following this, the player successfully picks up a prize object 15 corresponding to an R7 symbol, and the CPU 80 determines that the picked-up prize object 15 forms part of the winning combination. Accordingly, the CPU 80 allows the player to deposit the prize object 15 in the shooter unit 25 and controls the display device 30 to change the G7 symbol in the third (right) virtual reel to an R7 symbol (PHASE 4). At this stage, the CPU 80 determines that the predetermined winning combination has been formed and thus changes the U7 symbol in the second (middle) virtual reel to an R7 symbol and makes a payout to the player corresponding to the winning combination (PHASE 6).

Figure 21:
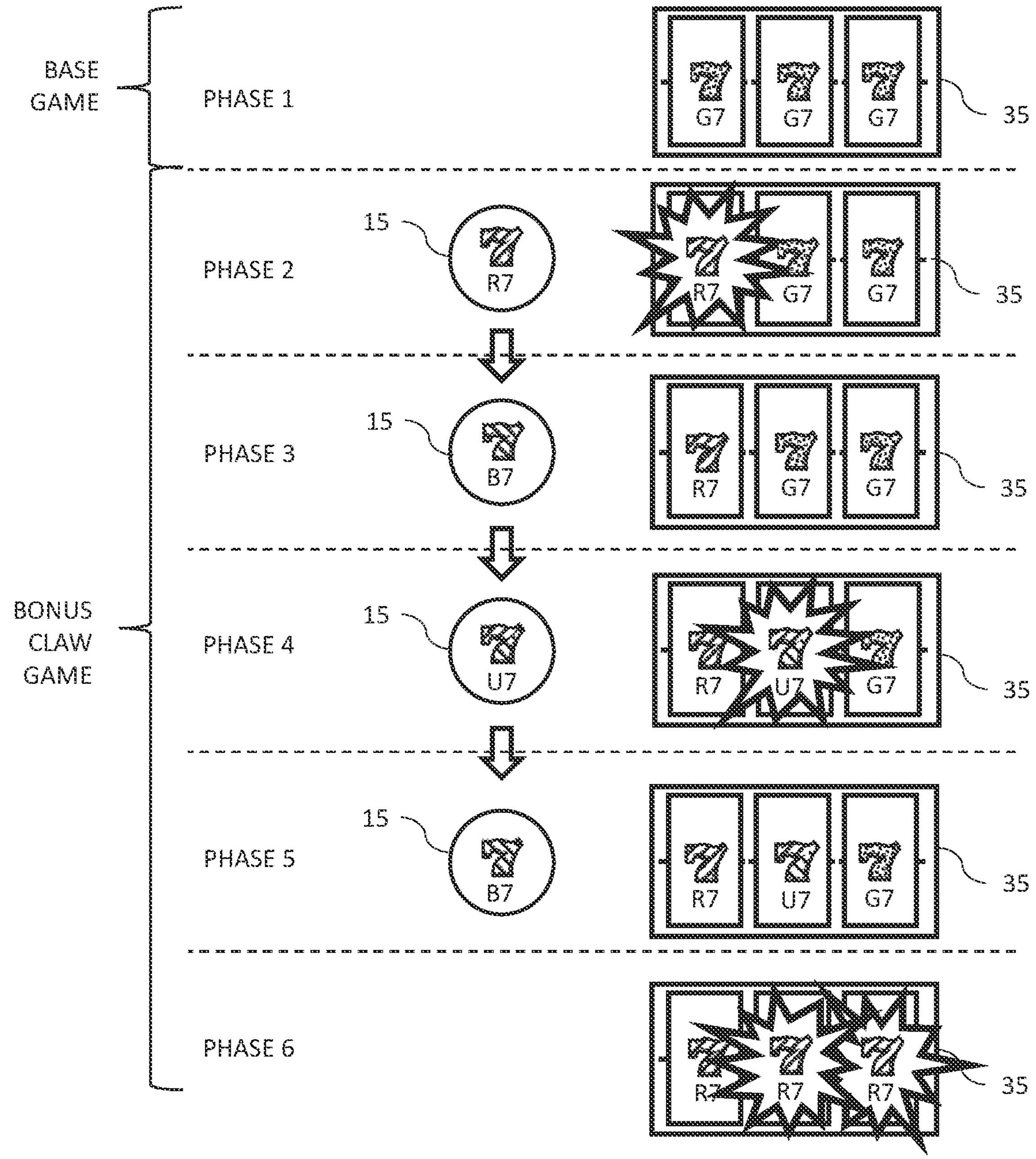
FIG. 21 is a second example of a game flow in a hybrid casino claw game, according to one embodiment of the present disclosure.

FIG. 21 shows a second example of a game flow in the hybrid casino claw gaming machine 100 according to an embodiment of the present disclosure. According to the second example, the bonus claw game start condition is satisfied in the base game by virtue of three G7 symbols being arranged on the payline in the virtual slot machine game 35 (PHASE 1). Upon satisfaction of the bonus claw game start condition, the CPU 80 determines the winning combination and activates the bonus claw game. In this example, the winning combination is three R7 symbols. Next, the player successfully picks up a prize object 15 corresponding to an R7 symbol, and the CPU 80 determines that the picked-up prize object 15 forms part of the winning combination. Accordingly, the CPU 80 allows the player to deposit the prize object 15 in the shooter unit 25 and controls the display device 30 to change the G7 symbol in the first (left) virtual reel to an R7 symbol (PHASE 2). Next, the player successfully picks up a prize object 15 corresponding to a B7 symbol, and the CPU determines that the picked-up prize object 15 does not form part of the winning combination and thus controls the claw assembly 20 to drop the prize object 15 without updating the virtual reels (PHASE 3). Next, the player successfully picks up a prize object 15 corresponding to a U7 symbol, and the CPU determines that the picked-up prize object 15, functioning as an R7 symbol, can form part of the winning combination, and thus allows the player to deposit the prize object 15 in the shooter unit 25 and controls the display device 30 to change the G7 symbols in the second (middle) virtual reels to a U7 symbol (PHASE 4). Following this, the player successfully picks up a prize object 15 corresponding to a B7 symbol and the CPU determines that the picked-up prize object 15 does not form part of the winning combination and thus controls the claw assembly 20 to drop the prize object 15 without updating the virtual reels (PHASE 5). At this point, the CPU 80 determines that the prescribed time period for the bonus claw game has expired, and thus control of the claw assembly 20 is locked. At this stage, the prize objects 15 successfully picked up by the player do not form the winning combination. However, as discussed above, the player is guaranteed to receive a payout corresponding to the winning combination, irrespective of the actual performance of the player in the bonus claw game (i.e., the outcome of the hybrid casino claw gaming machine 100 does not depend on the skill of the player). Accordingly, the CPU 80 controls the display device 30 to change the U7 symbol in the second (middle) virtual reel and the G7 in the third (right) virtual reel to R7 symbols, thereby forming the winning combination. This may be performed using a designated win game animation to provide additional suspense and excitement for the player. Once the winning combination has been formed, the payout is made to the player (PHASE 6).

Software

Reference to software in the present disclosure may encompass one or more computer programs that may encompass data, instructions, or both.

One or more tangible and non-transitory computer-readable media may store or otherwise embody software implementing particular embodiments. A tangible computer-readable medium may be any tangible medium capable of carrying, communicating, containing, holding, maintaining, propagating, retaining, storing, transmitting, transporting, or otherwise embodying software, where appropriate. A tangible computer-readable medium may be a biological, chemical, electronic, electromagnetic, infrared, magnetic, optical, quantum, or other suitable medium or a combination of two or more such media, where appropriate. Example tangible, non-transitory computer-readable media include, but are not limited to, application-specific integrated circuits (ASICs), compact discs (CDs), field-programmable gate arrays (FPGAs), floppy disks, floptical disks, hard disks, holographic storage devices, magnetic tape, caches, programmable logic devices (PLDs), random-access memory (RAM) devices, read-only memory (ROM) devices, semiconductor memory devices, and other suitable computer-readable media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose or specific-purpose computer system may execute software implementing particular embodiments, where appropriate.

Further examples are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure.

What is claimed is:

1. A casino claw gaming machine comprising:

a cabinet;

a play field within the cabinet, the play field supporting a plurality of prize objects;

a claw assembly moveably attached within the cabinet;

a shooter unit positioned within the cabinet;

a player input device positioned outside the cabinet;

a video display;

at least one processor;

at least one memory device storing a plurality of instructions, which when executed by the at least one processor causes the at least one processor to:

receive an electronic communication to begin a claw game;

determine a game outcome for the claw game based on a computerized random number generator;

allow the input device to control the claw assembly, thereby allowing a player of the claw game to position the claw assembly;

determine whether the player caused the claw assembly to pick up one of the plurality of prize objects;

when the player did not cause the claw assembly to pick up one of the plurality of prize objects and when the game outcome is a losing outcome, end the claw game;

when the player did cause the claw assembly to pick up one of the plurality of prize objects and when the game outcome is a losing outcome, cause the claw assembly to drop the picked-up prize object away from the shooter unit;

when the player did cause the claw assembly to pick up one of the plurality of prize objects and when the determined game outcome is a winning outcome, instruct the claw assembly to drop the picked-up prize object on the shooter unit; and when the player did not cause the claw assembly to pick up one of the plurality of prize objects and when the determined game outcome is a winning outcome, cause the video display to display a winning game presentation;

cause the video display to display messaging about the determined game outcome; and cause any awards from the claw game to be provided to the player.

2. The casino claw gaming machine of claim 1, wherein when a prize object is dropped on the shooter unit, the shooter unit verifies that the dropped prize object is a valid prize object.

3. The casino claw gaming machine of claim 2, wherein the shooter unit verifies the dropped prize object by at least one of (i) determining a weight of the dropped prize object, or (ii) reading an RFID tag of the dropped prize object.

4. The casino claw gaming machine of claim 1, wherein the claw assembly comprises a plurality of claw arms and at least two of the plurality of claw arms include a protrusion structured and arranged to prevent the claw assembly from picking up more than one of the plurality of prize objects at a time.

5. The casino claw gaming machine of claim 1, wherein the at least one processor comprises a game control processor and a field control processor.

6. The casino claw gaming machine of claim 1, wherein each of at least two of the plurality of prize objects comprise:

a weight, a suspension mechanism, a shell enclosing the weight and the suspension mechanism, and wherein the weight is movably held by the suspension mechanism so that when the prize object impacts a surface of the casino claw gaming machine, the weight moves independent from the shell to thereby reduce effects of any possible rebound movement of the prize object.

7. The casino claw gaming machine of claim 1, further comprising:

at least one weight sensor positioned underneath the play field, the at least one weight sensor configured to determine a decrease in weight of the play field; and wherein the at least one processor is configured to receive a communication from the at least one weight sensor regarding said determination of decrease in the weight of the play field, and based on the received communication, determine whether one of the plurality of prize objects was picked up.

8. The casino claw gaming machine of claim 1, wherein the claw assembly comprises at least one weight sensor configured to determine a weight of a picked-up prize object; and wherein the at least one processor is configured to receive a communication from the at least one weight sensor regarding said determination of the weight of the picked up prized object, and based on the received communication, determine whether one of the plurality of prize objects was properly picked up.

9. The casino claw gaming machine of claim 1, wherein each of the prize objects are of a uniform size and weight.

10. The casino claw gaming machine of claim 1, wherein the claw assembly comprises:

a plunger, hinges, claw arms coupled to the plunger via the hinges, and a stepper motor configured to move the plunger to cause the claw arms to rotate about the hinges and move the claw arms to pick up the prize object and drop the picked-up prize object.

11. The casino claw gaming machine of claim 1, further comprising:

tracks positioned within the cabinet assembly to enable the claw assembly to move, the tracks comprising optical sensors; and wherein the processor is configured to use information obtained by the optical sensors to (a) determine a location of the claw assembly, and (b) based on the determined location, select a predetermined release pattern to move the claw assembly in the predetermined release pattern and drop the picked-up prize object.

12. The casino claw gaming machine of claim 1, wherein, in response to a change in direction or a change in speed of the claw assembly, a predetermined release pattern causes the claw assembly to drop the picked up object while the claw assembly is traveling to a position above the shooter unit.

13. The casino claw gaming machine of claim 1, wherein the shooter unit is structured to hold the prize object the claw assembly has dropped on the shooter unit, wherein the shooter unit comprises a flap, a ramp coupled to the flap, and an actuator, and wherein the processor is configured to cause the actuator to move the flap, thereby causing the prize object on the shooter unit to move down the ramp and onto the play field.

14. The casino claw gaming machine of claim 1, wherein the shooter unit is configured to return the prize object the claw assembly has dropped on the shooter unit to the play field, and wherein the shooter unit comprises a moveable guide portion configured to control a direction in which the shooter unit returns the prize object the claw assembly has dropped on the shooter unit to the play field.

15. A casino claw gaming machine comprising:

a cabinet;

a play field within the cabinet, the play field supporting a plurality of prize objects;

a claw assembly moveably attached within the cabinet;

a shooter unit positioned within the cabinet;

a player input device positioned outside the cabinet;

a display device;

at least one processor;

at least one memory device storing a plurality of instructions, which when executed by the at least one processor causes the at least one processor to:

(a) receive an electronic communication to begin a claw game;

(b) determine a game outcome for the claw game based on a computerized random number generator;

(c) cause the claw assembly to move based on input received by the player input device;

(d) determine whether the claw assembly picked up one of the plurality of prize objects;

(e) when the claw assembly picked up one of the plurality of prize objects, determine whether the picked up prize object matches a component of the determined game outcome, (f) when the picked up prize object matches a component of the determined game outcome, instruct the claw assembly to drop the picked-up prize object on the shooter unit;

(g) when the picked up prize object does not to match a component of the determined game outcome, instruct the claw assembly to drop the picked-up prize object on the play field;

(h) when the picked-up prize object is dropped on the shooter unit, cause the shooter unit to verify the prize object dropped on the shooter unit and return the prize object dropped on the shooter unit to the play field;

(i) allow steps (d) through h to be repeated until a prescribed condition occurs;

(j) cause the display device to display messaging about the determined game outcome; and (k) cause any awards from the claw game to be provided to the player.

16. The casino claw gaming machine of claim 15, wherein the prescribed condition occurring is a prescribed amount of time elapsing or a prescribed number of determinations of whether the picked up prize objects matches a component of the determined outcome occurring.

17. The casino claw gaming machine of claim 15, wherein the determination of whether the picked-up prize object matches a component of the determined game outcome comprises identifying a symbol associated with the picked up prize object and determining whether the identified symbol forms part of a winning combination.

18. The casino claw gaming machine of claim 17, further comprising at least one of a (i) at least one weight sensor positioned underneath the play field or (ii) a weight sensor positioned in the claw assembly, and wherein the processor is configured to identify the symbol associated with the picked up prize object based on information received from at least one of (i) or (ii).

19. The casino claw gaming machine of claim 15, further comprising at least one of a (i) at least one weight sensor positioned underneath the play field or (ii) a weight sensor positioned in the claw assembly, and wherein the processor is configured to determine whether the claw assembly picked up one of the plurality of prize objects based on information received from at least one of (i) or (ii).

20. A method of controlling a casino claw gaming machine, comprising:

receiving an electronic communication to begin a claw game;

determining a game outcome for the claw game based on a computerized random number generator;

causing a claw assembly to move based on input received by a player input device;

determining if the claw assembly picked up one of a plurality of prize objects;

when the determined game outcome is a losing outcome and a prize object was not picked up, ending the claw game;

when the determined game outcome is a losing outcome and a prize object was picked up, causing the claw assembly to drop the picked-up prize object onto the play field;

when the determined game outcome is a winning outcome and a prize object was picked up, causing the claw assembly to drop the picked-up prize object on a shooter unit;

when the determined game outcome is a winning outcome and a prize object was not picked up, causing a video display device to display a winning game presentation;

causing the video display to display messaging about the determined game outcome; and causing the shooter unit to return any prize object dropped onto it back to the play field.

* * * * *